United States Patent [19]
Fitzpatrick

[11] 3,732,728
[45] May 15, 1973

[54] BOTTOM HOLE PRESSURE AND TEMPERATURE INDICATOR

[75] Inventor: John R. Fitzpatrick, Tulsa, Okla.

[73] Assignees: Douglas Fitzpatrick, Tulsa, Okla.; William N. Dawson; Robert S. Tyler, ; part interest to each

[22] Filed: Jan. 4, 1971

[21] Appl. No.: 103,721

[52] U.S. Cl. ............................73/151, 340/18 NC
[51] Int. Cl. ..............................................G01v 11/00
[58] Field of Search........................73/151, 154, 152; 340/18 NC; 181/0.5 BE

[56] References Cited

UNITED STATES PATENTS

| | | | |
|---|---|---|---|
| 2,414,719 | 1/1947 | Cloud | 73/152 X |
| 2,933,923 | 4/1960 | Milochik | 73/154 |
| 3,233,674 | 2/1966 | Leutwyler | 340/18 NC |
| 3,305,825 | 2/1967 | Godbey | 73/151 X |
| 2,759,143 | 8/1956 | Arps | 73/151 X |

*Primary Examiner*—Jerry W. Myracle
*Attorney*—William S. Dorman

[57] ABSTRACT

A bottom hole indicator for determining the pressure and temperature at the bottom of a well bore, and which is particularly designed and constructed for substantially permanent bottom hole installation of the pressure and temperature sensing instrumentation utilizing existing oil well tubing as an information conductor, and the portability of the well head information collection and recording equipment for permitting frequent and economical measurements of reservoir pressure and temperature at the bottom of the well bore.

39 Claims, 21 Drawing Figures

INVENTOR.
JOHN R. FITZPATRICK
BY
William S. Dorman
ATTORNEY

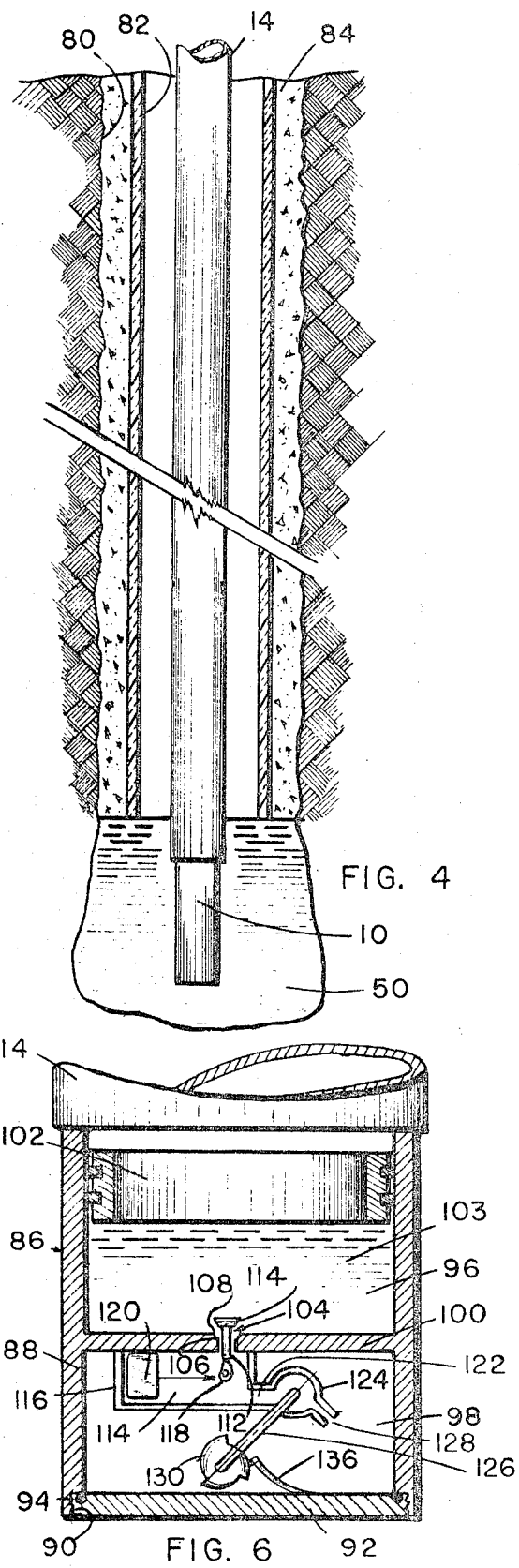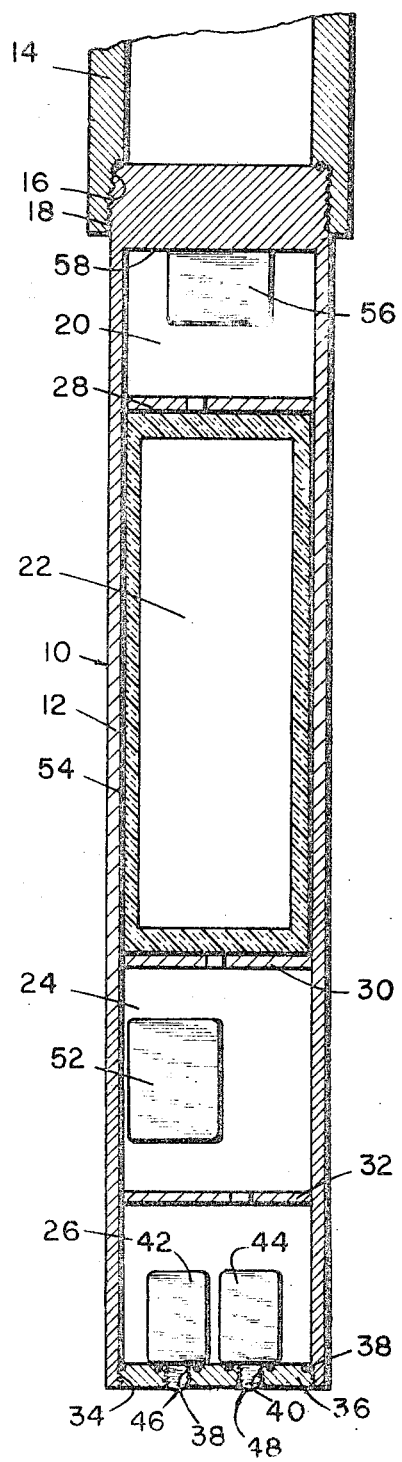

INVENTOR.
JOHN R. FITZPATRICK
BY William S. Dorman
ATTORNEY

PATENTED MAY 15 1973 3,732,728

INVENTOR.
JOHN R. FITZPATRICK
BY
William S. Dorman
ATTORNEY

INVENTOR.
JOHN R. FITZPATRICK
BY
William S. Dorman
ATTORNEY

BOTTOM HOLE PRESSURE AND TEMPERATURE INDICATOR

This invention relates to improvements of both method and means for measuring pressure and temperature at the bottom of well bores and more particularly, but not by way of limitation, to a bottom hole pressure and temperature indicator having sensing instrumentation permanently installed in the well bore at the bottom of the well tubing, the output information of which is transmitted along the existing tubing in the bore hole by a magnetic flux linking means, by sonic means, or by ultrasonic binary coded means to a well head information collection apparatus at the top of the well.

For effective management of a producing oil well, or the like, it is necessary that the fluid reservoir pressure and temperature be made available. The present method and means for detecting pressure and temperature at the bottom of well bores, both land based and off-shore, is a very expensive and time-consuming process, and for this reason the operation is accomplished only about once a year. It is a general practice to shut down a well prior to the taking of pressure and temperature readings to permit stabilization of the fluid reservoir for determination of a representative pressure thereof. During the shut-in or shut-down period, all operating equipment at the well location is normally stopped thereby creating a quiet environment. Any obstructions (such as pumping equipment) within the tubing must then be removed to allow the insertion and lowering of conventional temperature and pressure detecting apparatus into the well. After the taking of pressure and temperature readings it is necessary to remove said detecting apparatus, reinstall the pumping equipment, and start up production operations again.

As is clearly apparent from the above, the present method and means of detecting well bottom pressure and temperature has many disadvantages in that pumping operations are required to be shut down for a substantial period of time, the removal and reinstallation of pumping equipment to permit insertion of conventional sensing apparatus is an expensive and time-consuming operation tying up men and equipment, hence the operation can be economically performed only about once per year, thereby depriving management of needed information for effective oil production.

The present invention contemplates a novel bottom hole pressure and temperature indicator designed and constructed for overcoming the above disadvantages and particularly, to provide for the economical detection of pressure and temperature at much more frequent intervals than is presently feasible. This invention comprises a relatively low cost bottom hole sensing instrumentation unit which is permanently installed in the well bore at the bottom of the well tubing, a magnetic flux linking means for information transmission along the pipe to the well head (or in the alternative, sonic or ultrasonic transmission along the pipe to the well head), and a portable well head information collection and recording apparatus. The permanently installed, self-contained bottom hole instrumentation unit will eliminate the costly removal and reinstallation of pumping equipment for the insertion of conventional detecting apparatus thereby causing the wells to be shut down for a much shorter time than is presently required. The use of existing pipe or tubing for the transmission of pressure and temperature information substantially eliminates any need for hard line cable connection with the installed bottom hole sensing unit. The well head information collection apparatus may be portably moved from well site to well site, attaching said information collection apparatus to each well head tubing thereby receiving and recording the transmitted pressure and temperature information. It is also apparent that one such well head unit may be used to service many wells.

It is an important object of this invention to provide a bottom hole pressure and temperature indicator for determining reservoir pressure and temperature at the bottom of oil wells through an economical method and means whereby such readings may feasibly be taken at a more frequent interval than is presently possible.

It is another object of this invention to provide a bottom hole pressure and temperature indicator wherein the bottom hole sensing instrumentation is a substantially permanently installed self-contained unit which may be preset to transmit information at specified time intervals.

It is still another object of this invention to provide a bottom hole pressure and temperature indicator wherein the pressure and temperature information is transmitted by a magnetic flux linking means along the existing pipe utilizing inductive coupling with said pipe.

It is still another object of this invention to provide a bottom hole pressure and temperature indicator wherein the pressure and temperature information is transmitted by sonic means along the existing pipe to the well head.

It is still another object of this invention to provide a bottom hole pressure and temperature indicator wherein the pressure and temperature information is transmitted in binary coded format by ultrasonic means along the existing pipe to the well head.

It is still another object of this invention to provide a bottom hole pressure and temperature indicator wherein the transmitted pressure and temperature information is received, processed, and recorded at the top of the well by a portable well head information collection apparatus which may be moved from well to well thereby being used to service several oil wells.

Other and further objects and advantageous features of the present invention will hereinafter more fully appear in connection with a detailed description of the drawings in which:

FIG. 4 is a general sectional elevational view of a typical oil well bore with a bottom hole unit embodying the invention attached to the bottom of the existing tubing.

FIG. 5 is a sectional elevational view of a sonic bottom hole instrumentation unit embodying the invention.

FIG. 6 is a sectional elevational view of an alternate sonice bottom hole means for the sensing and transmission of pressure information.

SONIC MEANS

Figure 1:
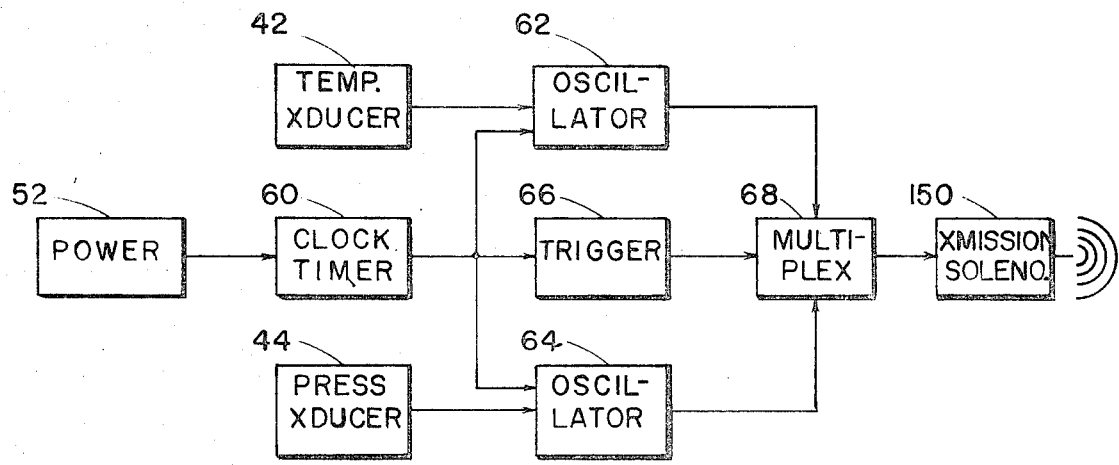
FIG. 1 is a functional block diagram depicting the general operating functions of a permanently installed bottom hole sensing instrumentation unit embodying the invention for transmission of pressure and temperature information by sonic means along the existing pipe to the well head.

Referring to the drawings in detail, particular attention is directed to FIGS. 1 through 5 which relate specifically to a sonic bottom hole pressure and temperature indicator means which may be substantially permanently installed in the oil well at the bottom of the existing tubing, the output information of which is transmitted along the existing tubing by sonic means to a well head information collection apparatus at the top of the well.

Figure 2:
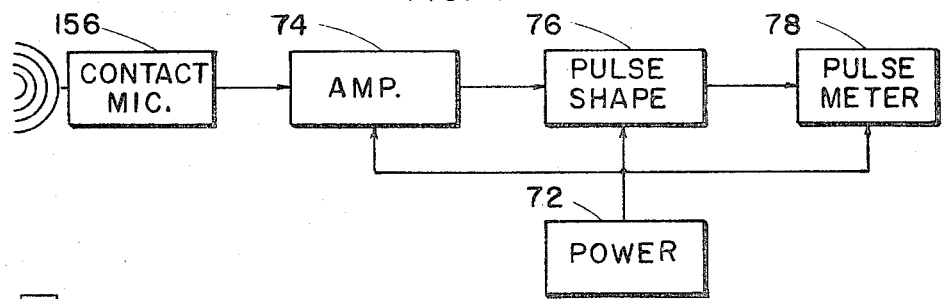
FIG. 2 is a functional block diagram generally depicting a well head instrumentation unit embodying the invention for receiving, processing, and displaying the sonic information train from the bottom hole unit of FIG. 1.
Figure 3:
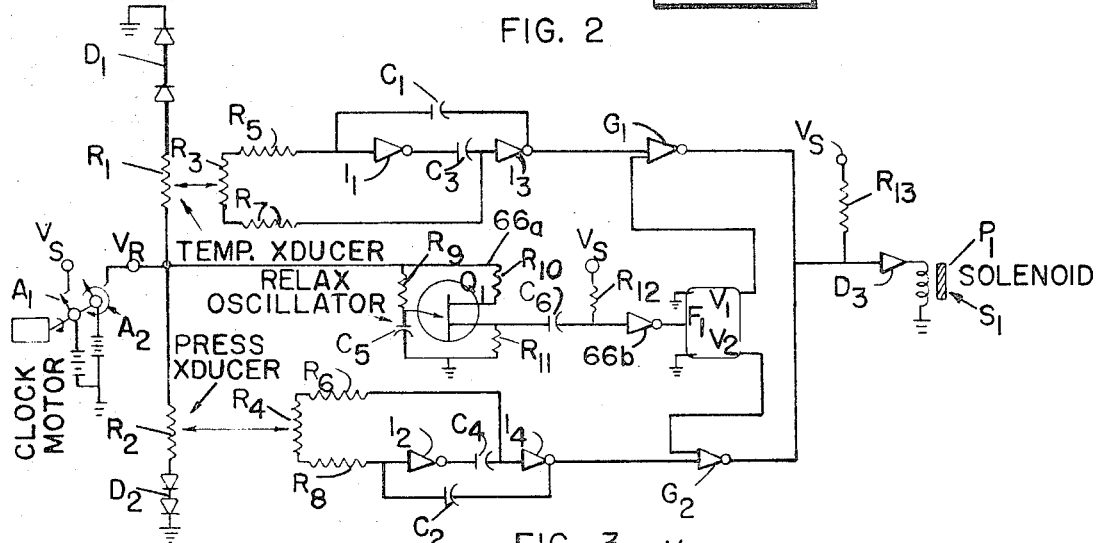
FIG. 3 is a detail schematic of the electronics of the bottom hole unit of FIG. 1.
Figure 3A:
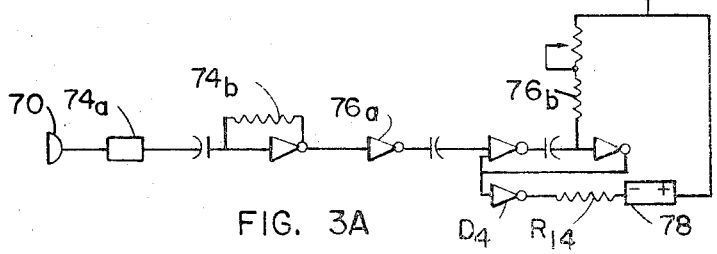
FIG. 3a is a detail schematic of the electronics of the well head unit of FIG. 2.

The sonic bottom hole pressure and temperature indicator means comprises a bottom hole sensing instrumentation unit which is generally indicated by reference character 10 in FIG. 5 and whose functional operation is depicted in the functional block diagram of FIG. 1 and the detailed schematic of FIG. 3, and a well head information collection apparatus (not shown) whose functional operation is depicted in the functional block diagram of FIG. 2 and the detailed schematic of FIG. 3a. The bottom hole unit 10 comprises an elongated cylindrical housing 12 which is rigidly attached to the bottom of an existing oil well tubing chain 14 by any well known method such as by the threaded means clearly shown in FIG. 5. The bottom end of the tubing 14 is provided with a threaded annular recess 16 interior to said tubing for receiving the top of the housing 12 which is provided with complementary exterior threaded means 18. The housing 12 is compartmentized into a transmitting compartment 20, an electronic compartment 22, a power supply compartment 24, and a sensor compartment 26, each of the compartments being separated by suitable partitions 28, 30, and 32, respectively, said partitions being provided with passageways (not shown) for the journalling of connection wiring (not shown) therethrough. The bottom of the housing 12 is provided with a threaded recess 34 for receiving a bottom plate 36 therein. The plate 36 is threadedly attached to the housing 12 and a fluid tight seal is provided by a suitable O-ring 38 in pressure contact with both the housing 12 and the plate 36. The plate 36 is also provided with two longitudinal threaded bores 38 and 40 for the attachment of a temperature transducer 42 and a pressure transducer 44, respectively, thereby allowing the temperature transducer sensing head 46 and the pressure transducer sensing head 48 to be disposed in physical contact with the oil well reservoir 50.

A bottom hole unit regulated power source 52 is located in the power compartment 24 and rigidly secured therein by any well known manner (not shown). The electronics compartment 22 is provided with a suitable temperature insulation lining 54 for preventing a rapid temperature increase when the unit 10 is lowered into the reservoir 50. A sound transmission device 56 is located in the upper compartment 20 and is rigidly secured to the interior face 58 of the upper portion of the housing 12 for reasons as will be hereinafter set forth.

A mechanical clock timer 60 is located in the compartment 22 and may be preset to periodically activate the bottom hole pressure and temperature indicator unit at predetermined intervals and to subsequently turn the unit off. When the unit is activated, power is provided from the regulated power source 52 to a temperature voltage controlled oscillator 62, a pressure voltage controlled oscillator 64, a trigger generator 66, a multiplexer 68 and the sound transmission device 56. The output frequencies of the oscillators 62 and 64 are controlled by the input voltage provided by the resistance bridge type temperature transducer 42 and likewise by the resistance bridge type pressure transducer 44, respectively. The frequency modulated output of the oscillators 62 and 64 are gated by the trigger generator 66 through the multiplexer 68 thereby allowing the oscillators 62 and 64 to automatically drive the sound transmission device 56 at a frequency proportional to the reservoir temperature and pressure, respectively. The sound transmission of the device 56 is accomplished by a solenoid $S_1$ which is installed in a manner (not shown) such that the solenoid reciprocating plunger $P_1$ will strike the face 58 of the housing 12 thereby generating a tapping sound. The tapping sound is then transmitted from the housing 12 into the tubing 14 to the well head information collection apparatus at the top of said tubing.

The well head apparatus comprises a contact microphone 70 which is secured to the upper end of the tubing 14 for receiving the tapping sound from the bottom hole unit 10. The well head apparatus also comprises a power supply 72 which provide electrical power to an amplifier 74, a pulse conditioner 76, and a pulse meter and recorder 78. The sonic tapping pulses are received by the microphone 70 and are subsequently amplified by the amplifier 74. The pulses are then squared up and then given a constant width by the pulse conditional 76. The output of the pulse conditioner 76 is in the form of a pulse train whose frequency is proportional to the bottom hole reservoir pressure and temperature. This pulse train is then used as an input signal to a pulse meter and recorder 78 for display and recording.

The clock timer 60 comprises a clock motor 60a which may be powered by a conventional windup mainspring or by the regulated power source 52 and having a mechanism as generally indicated by reference character 60b. The timing mechanism generally comprises rotatable contact arms A1 and A2 which upon rotation into closure will provide electrical power from the source 52 to interrogate the bottom hole unit for temperature and pressure measurements, to transmit the sonic information and to subsequently turn the unit off as will be hereinafter set forth. The regulated power source 52 comprises either a bank of one or more conventional dry cell batteries (not shown), a nuclear power supply (not shown) or a high temperature solid state battery such as is manufactured by Gould Ionics, which provides two basic voltage outputs $V_R$ and $V_S$. The voltage output $V_R$ is the primary power supply voltage and is utilized to first supply a reference voltage for the temperature and pressure transducers 42 and 44 and secondly to provide bias voltage to the various integrated circuits, making up the bottom hole unit electronics.

The voltage output $V_S$ is utilized to provide a voltage supply to the trigger generator 66 and the sound transmission device 56. The contacts A1 and A2 of the timing mechanism 60b serves as the connection device for the voltage outputs $V_R$ and $V_S$, respectively.

The temperature transducer 42 comprises a variable temperature sensitive resistance bridge or voltage divider network indicated by reference character $R_1$, and suitable rectifier $D_1$ to add stability and linearity to the voltage output provided to the voltage controlled oscillator 62. The voltage controlled oscillator 62 comprises inverters $I_1$ and $I_3$ connected in series and parallel with capacitors $C_1$ and $C_3$ as shown in FIG. 3 to form an astable multivibrator (square wave generator). A variable resister $R_3$ is provided at the input of the oscillator 62 to control the duty cycle of the square wave output, and resistors $R_5$ and $R_7$ are provided for suitable feedback as an extension of the variable resistor $R_3$. The operating frequency ($f_t$) of the oscillator 62 is inversely proportional to the resistance of the output resistor $R_1$ of the temperature transducer 42 and is determined by the formula, $$f_t = \frac{1}{0.7(C_1 C_3) R_1 \frac{1}{2}(R_3 R_5 R_7)}$$

The pressure transducer 44 comprises a pressure sensitive resistance bridge or voltage divider network indicated by reference character $R_2$ and is identical in operation to temperature transducer 42 as described above wherein the rectifier $D_2$ is identical to the rectifier $D_1$ above. The voltage controlled oscillator 64 is operationally identical to that of the oscillator 62 and the operational frequency ($f_p$) is determined by the formula, $$f_p = \frac{1}{0.7(C_2 C_4) R_2 \frac{1}{2}(R_4 R_6 R_8)}$$

The outputs of the oscillators 62 and 64 are provided to the multiplexer 68 as will be hereinafter set forth.

The trigger generator 66 comprises a relaxation oscillator circuit indicated by reference character 66a and an inverter buffer 66b. The voltage $V_R$ across a resistor $R_9$ and a capacitor $C_5$ causes said capacitor $C_5$ to slowly charge (rate of charge is dependent on the resistance value of $R_9$). When the capacitor $C_5$ is fully charged, the unijunction transistor $Q_1$ will trigger providing a pulse voltage from $V_R$ across resistors $R_{10}$ and $R_{11}$ to ground. The pulse voltage is transmitted across the capacitor $C_6$ through the resistor $R_{12}$ to the voltage source $V_S$ thereby providing a voltage pulse at the input of the inverter buffer 66b. The buffer 66b will then shape the voltage pulse into a square wave for triggering the multiplexer 68 for reasons that will be hereinafter set forth.

The multiplexer 68 comprises a flip-flop switching means $F_1$, a temperature information NAND gate $G_1$, and a pressure information NAND gate $G_2$. The switching means $F_1$ is a common integrated circuit flip-flop with output voltages $V_1$ and $V_2$ which are alternately present depending on the state of the flip-flop. The state of the flip-flop is changed by each input pulse from the trigger generator 66 thereby alternately providing an output voltage $V_1$ and $V_2$ to the NAND gates $G_1$ and $G_2$, respectively. The frequency modulated output of the voltage controlled oscillator 62 is connected to the NAND gate $G_1$ and is allowed to pass through the gate $G_1$ to the transmitter 56 only when the gating voltage $V_1$ is also present at the gate $G_1$.

The transmission device 56 comprises a driver amplifier $D_3$ and the solenoid means $S_1$. The frequency modulated (FM) output of the oscillators 62 and 64 are alternately passed through the gates $G_1$ and $G_2$ and across the transmitter input resistor $R_{13}$ inputting said FM signal into the driver $D_3$. The output of the driver $D_3$ is then passed through a solenoid coil $L_1$ of the solenoid $S_1$ thereby causing the plunger $P_1$ to physically strike the bottom hole unit housing 12 as hereinabove set forth. The striking frequency of the plunger $P_1$ is the same as the frequency of the FM input to the transmitter 56 and hence proportional to the bottom hole reservoir pressure and temperature. The component parts for the sonic bottom hole unit electronics described above are readily available in the market in integrated circuit form.

The contact microphone 70 of the well head unit is attached to the top of the oil well tubing chain 14 for receiving the frequency modulated sonic pulse train for the bottom hole unit. The output of the microphone 70 is amplified by the amplifier 74 which comprises a preamplifier 74a and a feed-back inverter amplifier 74b. The pulse train output of the amplifier 74 is then inputted to the pulse conditioner 76. The pulse conditioner 76 comprises a pulse shaping inverter 76a and a pulse monostable circuit 76b whereby the input pulse train is squared up when passed through the inverter 76a and the duty cycle of the pulses are made uniform in the pulse monostable circuit 76a. The constant width pulse train is then passed through an inverter driver $D_4$, through a load resistor $R_{14}$ and into the pulse meter and recorder means 78. The frequency of the pulse train is then converted (in the meter 78) to a direct scale deflection for display of bottom hole reservoir pressure and temperature. The component parts for the sonic well head unit electronics described above are readily available in integrated circuit form.

FIG. 4 is a sectional elevational view of a typical oil well comprising generally a borehole 80 with a casing 82 journalled therein and an oil reservoir 50 generally at the bottom of the bore hole 80 but which may extend well up into the casing 82. The casing 82 is laterally supported within the bore hole 80 by a fill of concrete 84. In use, the sonic bottom hole unit 10 is prepared for substantially permanent installation within the oil well. This preparation consists of generally presetting the clock timer 60 for interrogation and information transmission at desired intervals and to calibrate the oscillators 62 and 64 and adjust the duty cycle of said oscillators by the variable resistors $R_3$ and $R_4$. The unit 48 is then sealed and attached to the bottom of the tubing 14 as hereinabove set forth. The unit, attached to the tubing, is then lowered through the casing 83 and into the reservoir 50 at the bottom of the well. At the preset time for interrogation and transmission, the well head contact microphone 70 is attached to the top of the tubing 14. It is to be noted that the well head information collection apparatus may be a portable unit capable of being moved from well to well, or may be permanently installed and left unattended at each well. The bottom hole unit, upon interrogation by the clock timer 60, then alternately transmits reservoir temperature and pressure information by sonic tapping means along the tubing 14 to the top of the well as hereinabove set forth. This tapping sound is picked up by the well head microphone 70, processed and converted so as to allow the reading of bottom hole reservoir temperature and pressure in the manner described above.

ALTERNATE SONIC MEANS

Particular attention is directed to FIG. 6 which depicts an alternate sonic bottom hole unit generally indicated by reference character 86 for the measurement and transmission of reservoir pressure whereby transmission of the reservoir pressure is accomplished by a sonic tapping whose frequency is proportional to the reservoir pressure. The sonic well head information collection apparatus described above is suitable for use with the bottom hole unit 86.

The unit 86 comprises an elongated cylindrical housing 88 which is rigidly attached to the bottom of an existing oil well tubing chain 14 in any well known manner (not shown). The top end of the housing 88 is in open communication with the open end of the tubing 14. The bottom end of the housing 88 is provided with a threaded annular recess 90 for receiving a complementarily threaded bottom plate 92 therein. The plate 92 is threadedly attached to the housing 88 and a fluid tight seal is provided by a suitable O-ring 94 in pressure contact with the housing 88 and the plate 92. The housing is partitioned into an upper pressure chamber 96 and an instrumentation chamber 98 by a suitable rigid divider plate 100. The lower portion of the tubing 14 is provided with a plurality of bores (not shown) to allow the reservoir fluid 50 to be transmitted into the tubing 14 and at the pressure existing in the fluid reservoir. The chamber 96 is separated from the reservoir fluid 50 by a cylindrical shaped piston member 102 which is slidably disposed within the upper portion of the chamber 96. The chamber 96 beneath the piston member 102 is filled with a substantially incompressible system fluid 103 which is not subject to viscosity changes with respect to temperature change.

A meter valve means generally indicated by reference character 104 is centrally disposed within the partition plate 100 whereby the fluid in the chamber 96 may be passed into the lower chamber 98 as will be hereinafter set forth. The meter valve means 104 comprises a vertically disposed bore 106 through the plate 100. The top of the bore 106 is provided with a counter-sink bore which acts as the valve seat 108. The valve 104 is also provided with a valve gate member 110 which comprises a cylindrical shaft 112 which is substantially smaller than the cross sectional diameter of the bore 106, and a gate seating member 114 which is rigidly secured to the upper end of the shaft 112 and whose lower surface shape is complementary with the valve seat 108.

The lower instrumentation chamber 98 is provided with a smaller subchamber 114 surrounded by a housing 116 which is rigidly secured to the bottom face of the plate 100 in a manner which provides open communication between the subchamber 114 and the valve bore 106. A cam 118 is rotatably secured to the inside of the housing 116 by any well known manner (not shown). The valve shaft 112 is journalled within the bore 106 and made to rest on the surface of the rotatable cam 118. The shape of the cam 118 is such that upon rotation, the valve gate member will be made to alternately raise (unseat) and lower (seat) thereby allowing for system fluid of the chamber 96 to pass through the subchamber 114. The fluid tight clock drive 120, with an internal power supply means contained therein, is provided for driving the cam 118 thereby alternately opening and closing the valve 104 at preset intervals. The lower portion of the housing 116 is provided with a port 122 to which is connected with a meter type hydraulic motor 124.

The motor 124 comprises an input orifice (not shown) in communication with the port 130, a fluid flow rotating meter chaft 126 and an output orifice 128 in communication with the lower chamber 98. A striker cam 130 is rigidly secured to one end of the meter shaft 126. The cam 130 is provided with a plurality of outwardly spiraling arcuate surfaces 132 separated by recesses 134. A cam follower striker arm 136 is secured to the plate 92 at one end by any suitable means (not shown) and the other end is made to rest, under spring load pressure, against the surface of the cam 130. When the cam 130 is rotated the striker arm 136 will follow the arcuate surface 132 to the recesses 134 at which time the arm 136 will strike the succeeding arcuate surface thereby emitting a tapping sound whose frequency is proportional to the rotation speed of the cam 130 and shaft 126. This tapping sound is transmitted through the housing 88 into the tubing 14 and along said tubing to the well head.

In use, the reservoir pressure in the tubing 14 will exert a downward force on the piston 102 which will in turn exert an equal force on the fluid in the chamber 96. Therefore, the fluid pressure in the chamber 96 will be substantially equal to the reservoir pressure in the tubing 14. The clock drive 120 will, at preset intervals (such as once every month), rotate the cam 118, opening the valve 104 thereby allowing the fluid of chamber 96 to flow under pressure into the subchamber 98. The fluid will then pass through the port 122 and then through the hydraulic motor 124 thereby producing a rotation of the shaft 126. The speed of the rotation of the shaft 126 is proportional to the fluid flow rate through the motor 124. This fluid flow rate is also proportional to the fluid pressure in the chamber 96 which is in turn equal to the reservoir pressure as stated above. The rotation of the shaft 126 and its attached striker cam 130 will cause the striker arm 136 to produce a tapping sound as hereinabove set forth, said tapping sound having a frequency proportional to the reservoir pressure.

As hereinabove set forth, the tapping sound is transmitted along the tubing chain 14 to the well head information collection apparatus for processing, display, and recording the bottom hole reservoir pressure.

MAGNETIC FLUX MEANS

Particular attention is directed to FIGS. 7 through 12 which relate specifically to a bottom hole pressure and temperature indicator means which may be substantially permanently installed in the oil well at the bottom of the existing tubing, the output information of which is transmitted along the existing tubing by a magnetic flux linking means to a well head information collection apparatus at the top of the well.

Figure 7:
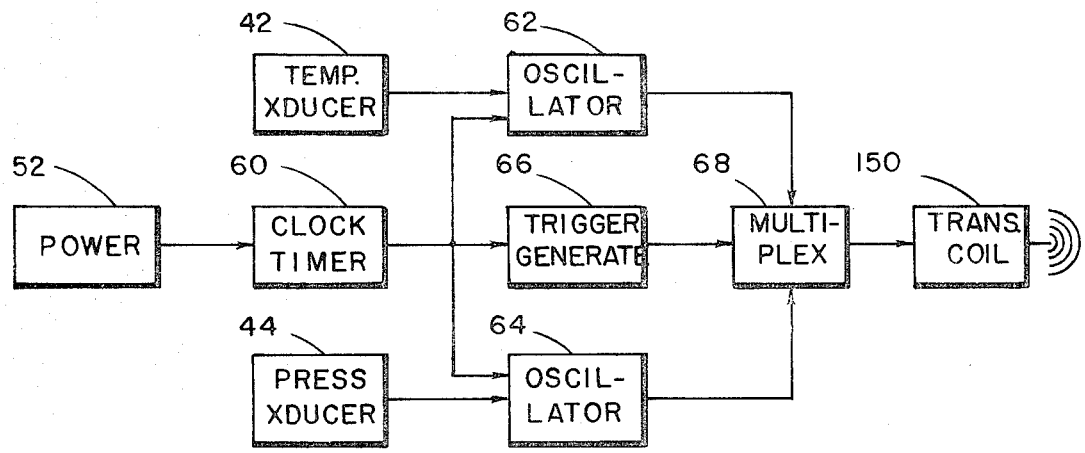
FIG. 7 is a functional block diagram depicting the general operating functions of a permanently installed bottom hole sensing instrumentation unit for transmission of pressure and temperature information by a magnetic flux linking means along the existing pipe to the well head.
Figure 8:
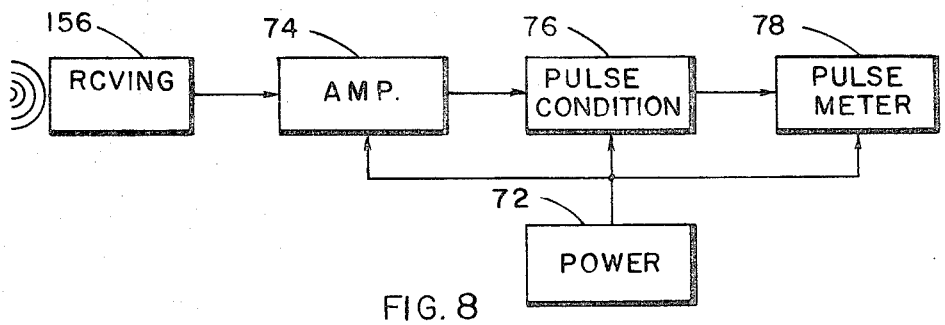
FIG. 8 is a functional block diagram generally depicting a well head installation unit for receiving, processing, and displaying the magnetic flux information train from the bottom hole unit of FIG. 7.
Figure 9:
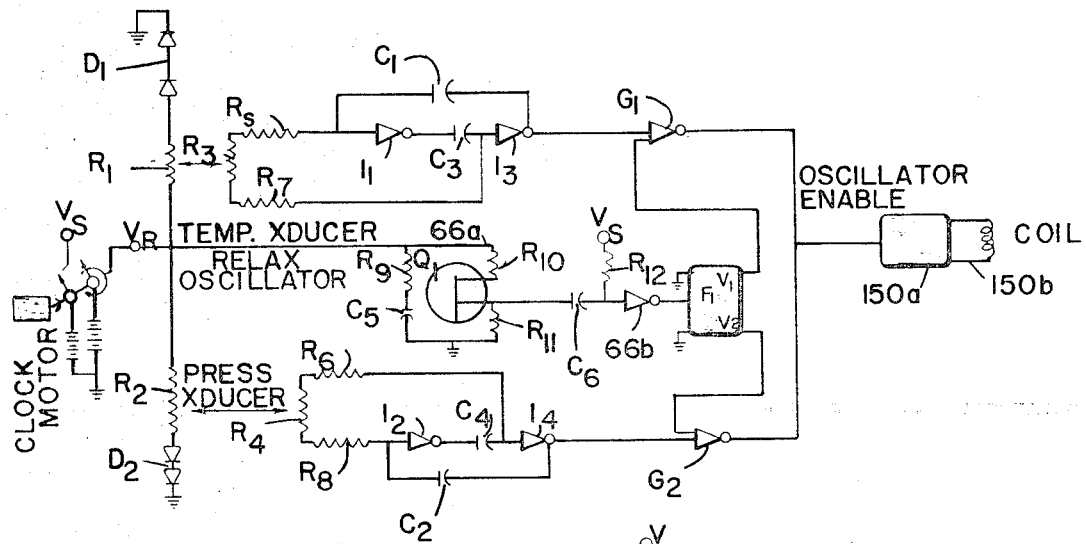
FIG. 9 is a detailed schematic of the electronics of the bottom hole instrumentation unit of FIG. 7.
Figure 9A:
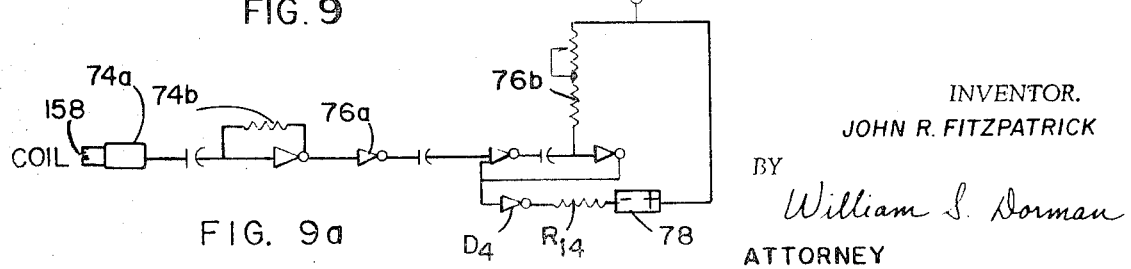
FIG. 9a is a detailed schematic of the electronics of the well head instrumentation unit of FIG. 8.
Figure 10:
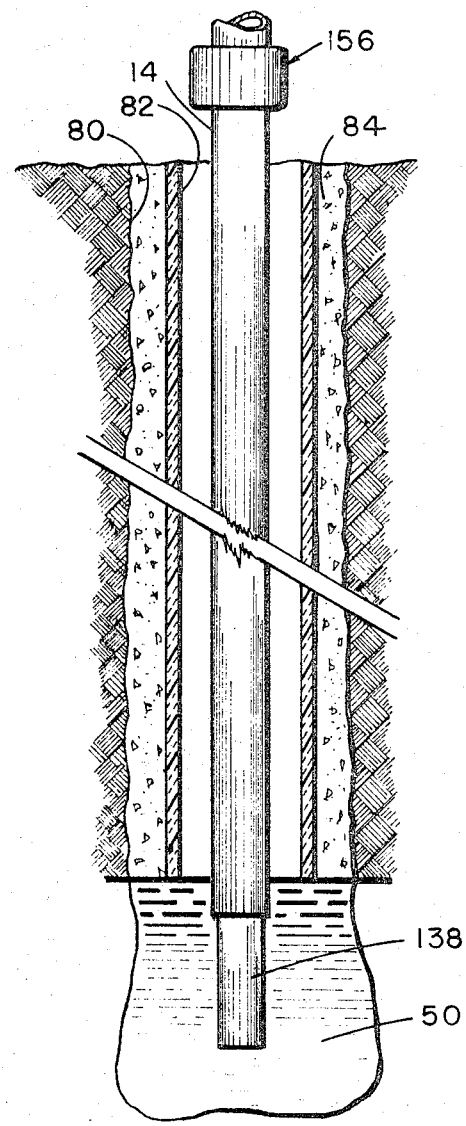
FIG. 10 is a sectional elevational view of a typical oil well bore with the bottom hole unit of FIG. 7 and the receiving coil of the well head unit of FIG. 8 attached to the existing pipe.
Figure 12:
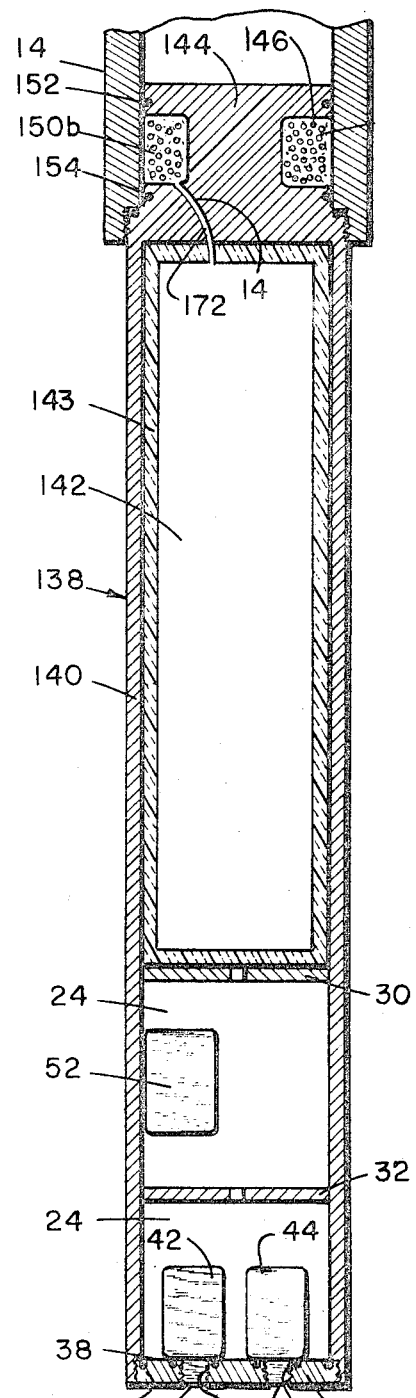
FIG. 12 is a sectional elevational view of the magnetic flux bottom hole unit embodying the invention.

The magnetic flux bottom hole pressure and temperature indicator comprises a bottom hole sensing instrumentation unit which is generally indicated by reference character 138 and whose functional operation is depicted in the functional block diagram of FIG. 7 and the detailed schematic of FIG. 9, and a magnetic flux well head information collection apparatus (not shown) whose functional operation is depicted in the functional block diagram of FIG. 8 and the detailed schematic of FIG. 9a. The bottom hole unit 138 comprises an elongated cylindrical housing 140 which is rigidly attached to the bottom of the existing oil well tubing chain 14 by any well known manner such as by the threaded means as depicted in FIG. 12. The bottom end of the tubing 14 is provided with a threaded annular recess 16 interior to said tubing for threadedly receiving the upper end of the housing 140. The housing 140 is compartmentized into an electronic compartment 142, a power supply compartment 24, (identical to the power compartment of the sonic unit 10) and a sensor compartment 26 (identical to that of the sonic uniw 10) with each compartment separated by suitable partitions 3 and 32, respectively, said partitions being provided with passageways (not shown) for the journalling of electrical connection wiring (not shown) therethrough. The bottom of the housing 140 is provided with a threaded annular recess 34 for receiving a bottom plate 36 which is identical to that of the sonic unit 10. The sensor compartment 26 contains similar equipment of that of the sonic unit 10 comprising temperature and pressure transducers 42 and 44, respectively. The power compartment 24 likewise uses a regulated power source 52 identical to that used in the sonic unit 10. The electronics compartment 42 is substantially the same as the compartment 22 of the sonic unit 10 but contains a coil drive oscillator in addition to the electronics present in the sonic unit 10. The electronics compartment 142 is provided with an insulation lining 143 for protection against rapid temperature increases. The upper portion of the housing 140 is provided with a cylindrical coil housing member 144 which is of a suitable cross sectional diameter to be slidably journalled within the tubing 14 when the housing 140 is attached to said tubing. The cylindrical member 144 is provided with a centrally located annular recess 146 for receiving a magnetic flux transmission coil 150b therein. The coil 150b is electrically connected with the electronics compartment by a suitable cable 148 which is journalled through a substantially vertically disposed bore 172. The coil 150b is protected by a fluid tight seal which is provided by suitable O-rings 152 and 154 disposed in annular grooves above and below said coil, respectively, each seal being in pressure contact with the cylindrical member 144 and the interior face of the tubing 14.

The functional operation of the magnetic flux bottom hole unit 138 is identical with that of the sonic unit 10 with the exception of the information transmission means. The output of the multiplexer 68 of the magnetic flux unit is provided directly inot the transmitter unit 150. The unit 150 comprises a coil drive oscillator 150a and the transmission coil 150b. The frequency modulated (FM) outputs of the temperature and pressure oscillators 62 and 64 are alternately gated by the multiplexer 68 to the transmitter unit 150 and serves to key the drive oscillator 150a on and off to provide a pulsing current through the coil 150b. This pulsing current through the coil 150b sets up alternating magnetic lines of flux which intersect the wall of the tubing 14 and are conducted along said tubing to the top of the well. The effect is that of a pulsating magnetic flux link set up in the tubing chain 14.

Figure 11:
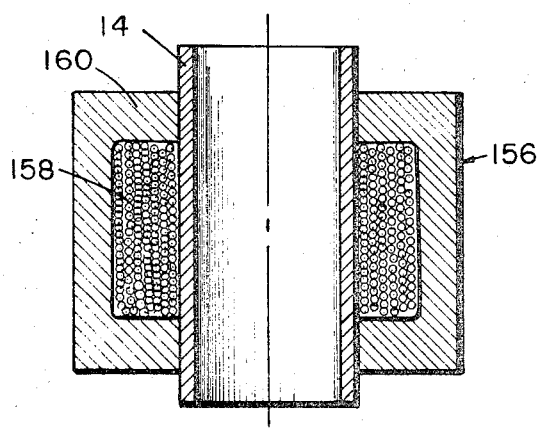
FIG. 11 is a sectional elevational view of the receiving coil of the well head unit of FIG. 8 attached to the upper portion of the pipe.

The magnetic flux well head information collection apparatus is also identical to that of the sonic well head apparatus with the exception of the information receiving means 156. The receiving means 156 comprises a receiving coil 158 contained in a suitable housing 160 such that the coil 158 may be slidably disposed down around the outer periphery of the top of the tubing 14, as shown in FIG. 11. The frequency modulated output of the coil 158 from the induced current is attached to the amplifier 74 and the received information is then processed, displayed and recorded in the same manner as that of the sonic well head information collection apparatus hereinabove described.

In use, the magnetic flux bottom hole unit 138 is prepared for substantially permanent installation within the oil well. This preparation is identical to that of the sonic unit 10 described above. After calibration the unit 138 is sealed and attached to the bottom of the tubing 14 as hereinabove set forth. The unit is then lowered through the casing 14 and into the reservoir 50. At the preset time for interrogation and information transmission, the well head receiving coil is placed around the outer periphery of the top of the tubing 14 for inductively receiving the pulsed lines of flux set up in the tubing 14 by the bottom hole transmission coil 150b.

The bottom hole unit 138, upon interrogation by the clock timer 60, alternately transmits reservoir temperature and pressure information by the FM pulsating flux linking means along the tubing 14 to the top of the well as hereinbefore set forth. It is to be noted that the bottom hole transmission coil 150b may be disposed around the outer periphery of the bottom of the tubing 14 as well as within the interior of the tubing as shown in FIG. 12. When installed as shown in FIG. 12, the tubing does not serve as a core for the boil 150b but will still serve as a conduction device for the magnetic lines of flux set up around the coil through a continuous eddy current type coupling chain.

ULTRASONIC DIGITAL MEANS

Particular attention is directed to FIGS. 13 through 18 which relate specifically to a bottom hole pressure and temperature indicator means which may be substantially permanently installed in the oil well at the bottom of the existing tubing, the information output of which is transmitted along the existing tubing by an ultrasonic binary coded means to an ultrasonic well head information collection apparatus at the top of the well.

Figure 13:
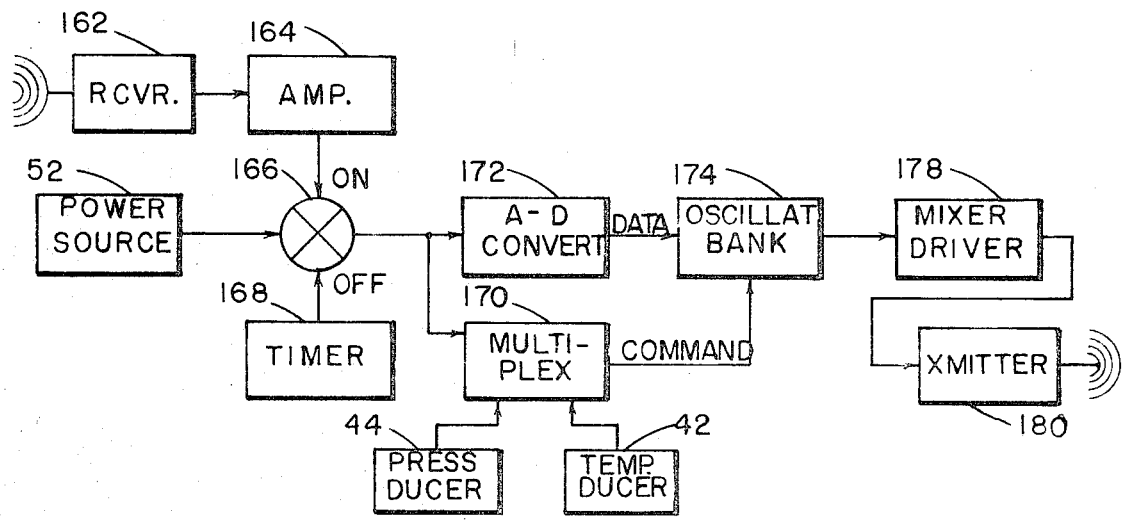
FIG. 13 is a functional block diagram depicting the general operational functions of a permanently installed bottom hole sensing instrumentation unit for transmission of pressure and temperature information by ultrasonic binary coded means along the existing pipe to the well head.
Figure 14:
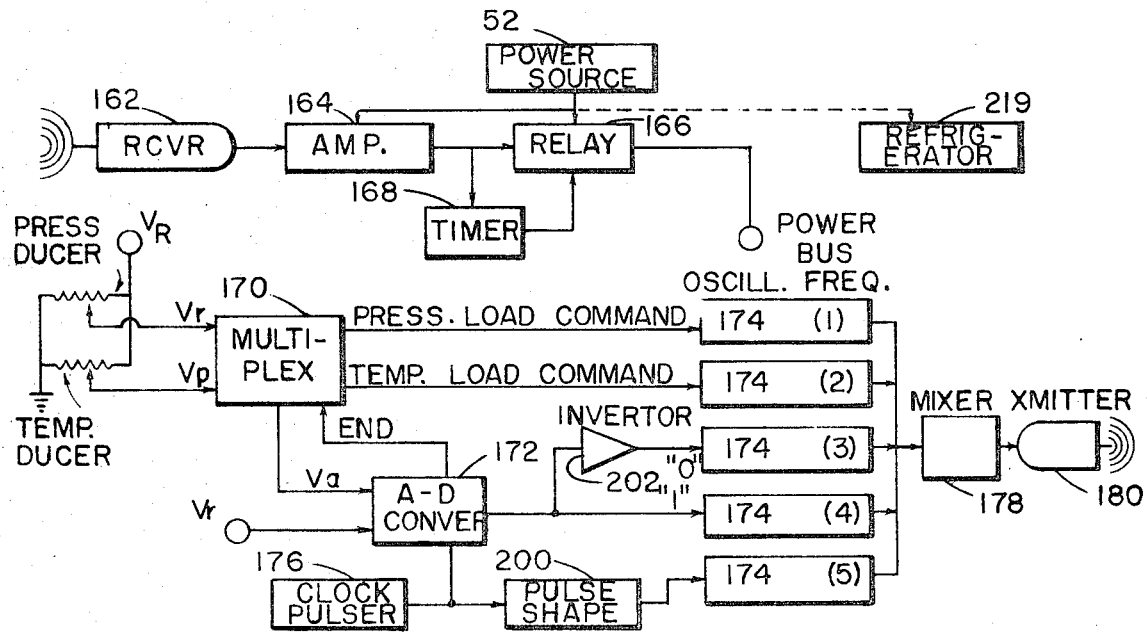
FIG. 14 is a detailed schematic of the electronics of the bottom hole instrumentation unit of FIG. 13.
Figure 17:
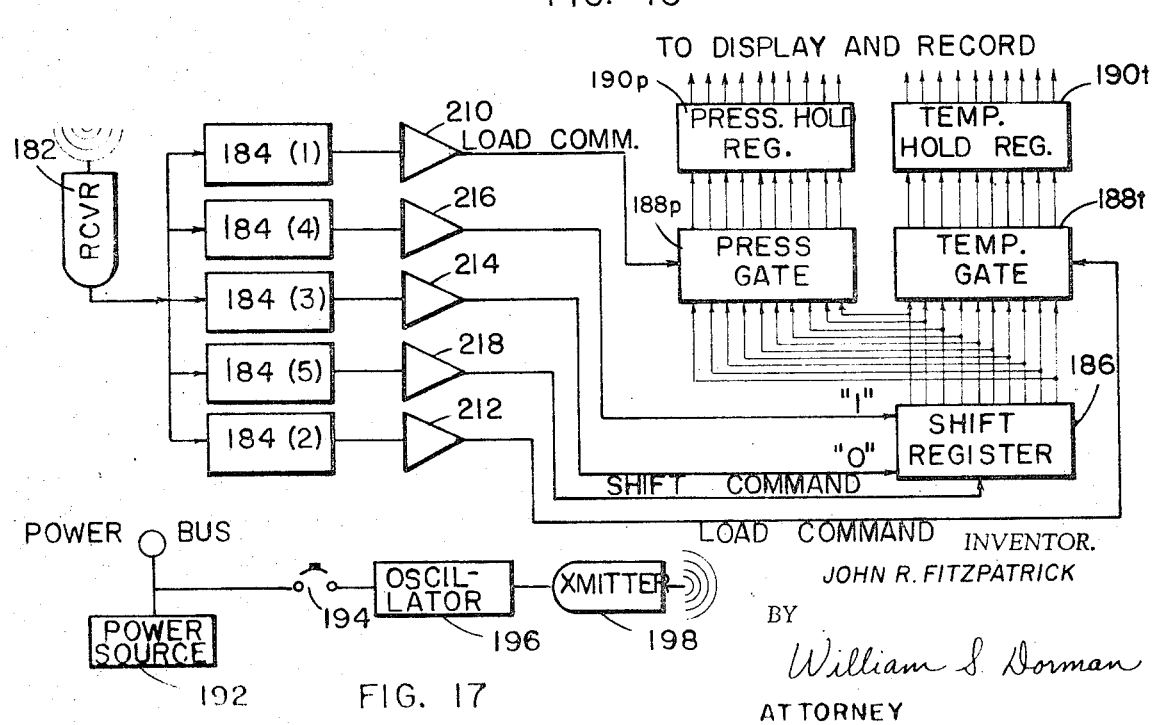
FIG. 17 is a detailed schematic of the electronics of the well head instrumentation unit of FIG. 16.
Figure 18:
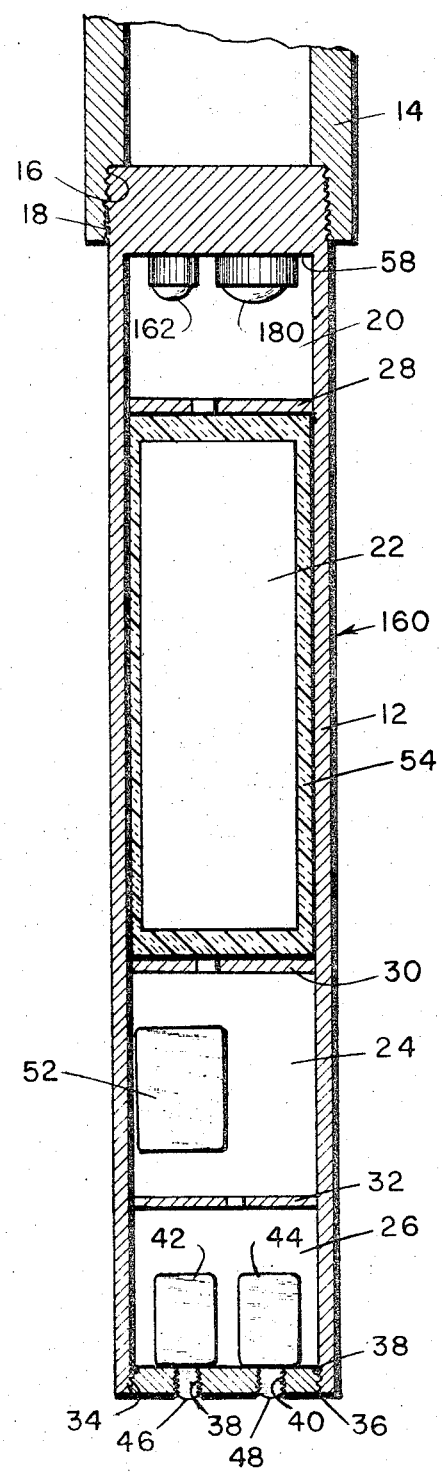
FIG. 18 is a sectional elevational view of the ultrasonic bottom hole instrumentation unit embodying the invention.

The ultrasonic digital pressure and temperature indicator comprises a bottom hole sensing instrumentation unit which is generally indicated by reference character 160 and whose operation is depicted in the functional block diagram of FIG. 13 and in the detailed schematic of FIG. 17. The bottom hole unit 160 comprises an elongated cylindrical housing 12 which is depicted as being identical to that of the sonic bottom hole unit 10 and is threadedly attached in a like manner to the bottom of the tubing chain 14. Again, the housing 12 is compartmentized into an upper transmitting compartment 20, an electronics compartment 22, which is provided with suitable temperature insulation lining 54, a power supply compartment 24 and a sensor compartment 26, each compartment being separated by suitable partitions 28, 30, and 32, respectively. The sensor compartment 26 and the power supply compartment 24 are identical to the sensor and power supply compartments of the sonic unit 10 in both content and construction. The electronics and transmitter compartments 22 and 20 are identical to the corresponding sonic unit 10 compartments in construction only, and differ in content as will be hereinafter set forth.

Rigidly mounted to the upper face 58 of the transmitter compartment 20 is an ultrasonic receiver 162 for the receiving of ultrasonic interrogation commands which are transmitted down the tubing 14 from the well head unit as will be set forth below. This command is amplified in the electronics compartment by a tuned amplifier 164 and is utilized to operate a power control relay 166 for providing electrical power from the regulated power source 52 to the bottom hole electronic components for measuring and transmitting reservoir temperature and pressure information to the surface as will be described below. This command signal is also utilized to start a turn-off monostable timer 168 which after a preset time for operation will disengage the power relay 166 and thereby return the bottom hole unit 160 to a stand-by status. When an interrogation command is received and the bottom hole unit thereby activated, representative temperature and pressure voltages are supplied to a multiplexer 170 from the transducers 42 and 44, respectively. These voltages are proportional to the reservoir temperature and pressure and are alternately supplied to an analog to digital converter 172 which converts the supplied voltages to a multi-bit binary number which is representative of the input voltage. This binary number is then serially shifted out of the converter 172 into an oscillator bank 174 by a clock pulser 176 and is converted into a dual frequency code which is then mixed in a mixer driver 178 and subsequently transmitted by an ultrasonic transmitter 180 along the tubing chain 14 to the well head in a manner that will be hereinafter set forth.

The well head information collection apparatus comprises a contact microphone receiver unit 183 which is sensitive to ultrasonic frequencies and is secured to the top of the tubing 14 for receiving the ultrasonic information signal from the bottom hole unit 160. The received information signal is then inputted to a discriminator bank 184 in which the frequencies are filtered and the binary message is serially shifted into a shift register 186 and subsequently gated, upon command, through a parallel gating device 188 into a holding register means 190 for display and recording. The well head apparatus also comprises a regulated power source 192 and an interrogation means consisting of an interrogating switch 194 which is used to turn on an ultrasonic oscillator 196, the output of which keys an ultrasonic transmitter 198. The transmitter 198 is connected to the top end of the tubing chain 14 and its output interrogation pulse is transmitted along said tubing chain 14 to the bottom hole receiver 162 as set forth above.

The bottom hole regulated power source 52 like that of the sonic bottom hole unit 10 comprises either a bank of conventional dry cell batteries, a nuclear power supply, or a high temperature solid state battery, each of which are readily available on the market. The temperature transducer 42 and the pressure transducer 44 are identical to those of the sonic unit 10, and by means of temperature and pressure sensitive resistant bridges, provide a voltage $V_t$ (proportional to the reservoir temperature) and a voltage $V_p$ (proportional to the reservoir pressure) to the multiplexer 170. The multiplexer 170 then passes one of these input voltages ($V_t$ or $V_p$, according to the initial state) to the analog to digital (A-D) converter 172. The A-D converter then converts this input voltage ($V_a$) into a representative 10 bit binary number which is serially shifted out of the converter 172 by the clock pulser 176 to the oscillator bank 174. When the entire 10 bit number has been shifted out of the A-D converter 172, an end-of-conversion pulse is supplised to the multiplexer 170 which causes the multiplexer to change states thereby allowing the other voltage ($V_t$ or $V_p$) to be inputted into the A-D converter. This end-of-conversion pulse also causes the multiplexer to provide a load command signal to the oscillator bank 174 for purposes as will be hereinafter set forth. The clock pulser 176 provides shifting pulses as set forth above to the A-D converter 172 and also synchronizing pulses through a pulse conditioner 200 to the oscillator bank 174. As the 10 bit binary number is shifted out of the A-D converter the voltage level representing the "1" bits is passed directly into the oscillator bank 174 and the voltage level representing the "0" bits is inverted by an inverter buffer 202 and passed into the oscillator bank 174. The oscillator bank 174 comprises five oscillators, each having a different output frequency. The oscillator 174(1) generates frequency 1 when supplied with a pressure load command signal from the multiplexer 170 and oscillator 174(2) generates frequency 2 when supplied with a temperature load command signal from the multiplexer 170. Oscillator 174(3) generates frequency 3 when supplied with a pulse from the buffer 202 (representing "0" in the binary number). Oscillator 174(4) generates frequency 4 when supplied with a pulse from the A-D converter 172 (representing "1" in the binary number). Oscillator 174(5) generates frequency 5 when supplied with a clock synchronization pulse from the pulse conditioner 200. The output of the oscillators of the bank 174 are then mixed in the mixer driver 178, the output of which is amplitude modulated and travels on an ultrasonic carrier frequency which is transmitted by the ultrasonic transmitter 180 along the tubing chain 14 to the well head.

Figure 15:
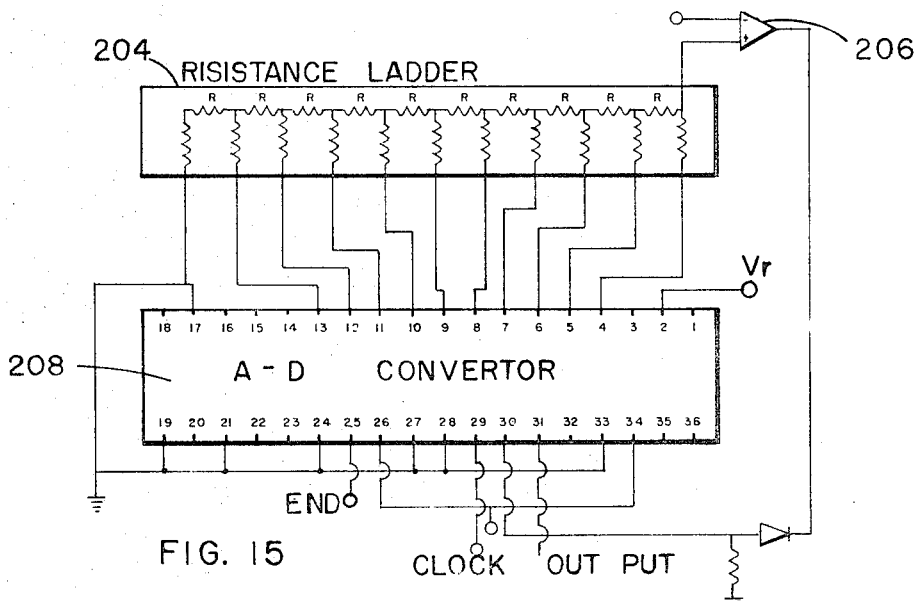
FIG. 15 is a detailed schematic of an analog-to-digital converter which is generally depicted in FIG. 14.
Figure 16:
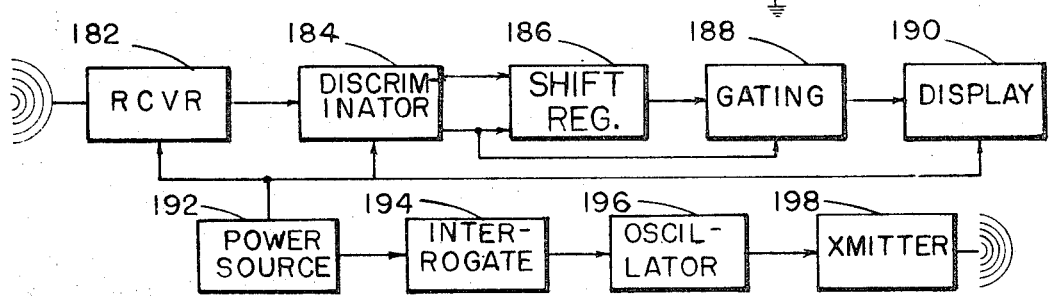
FIG. 16 is a functional block diagram depicting the general operating functions of a well head instrumentation unit for receiving, processing, and displaying the ultrasonic information train from the bottom hole unit of FIG. 13.

FIG. 15 depicts a detailed schematic view of the analog to digital converter 172 comprising a resistance ladder network 204, a comparator 206 (Fairchild micro A 710 B) and the basic converter 208 (Fairchild Micro Circuit 3751). The components making up the A-D converter 172 are readily available on the market.

Upon receipt of the binary information train and the command signal by the well head ultrasonic receiver 182, the signal is demodulated and inputted into the discriminator buffer bank 184 wherein the five bottom hole oscillator frequencies are filtered and separated into their individual links. The pressure load command signal (frequency 1) is separated out by filter 184(1) the output of which is conditioned by the buffer 210 and subsequently connected to the pressure gating means 188$_p$ of the well head gating device 188. Frequency 2 (temperature load command) is separated by the filter 184(2), passed through the buffer 212 and into the temperature gating means 188$_t$ of the gating device 188. Frequencies 3 and 4, representing the "0" and "1" bits of the binary number are separated by the filters 184(3) and 184(4) respectively, and passed through the buffers 214 and 216 and subsequently into the shift register 186. The clock synchronization pulse represented by frequency 5 is separated by the filter 184(5), passed through the buffer 218 and subsequently into the shift register 186 for the purpose of synchronizing the serial shifting of the binary number into said shift register 186. The holding register means 190 comprises a pressure holding register 190$_p$ for the receiving and displaying of the binary number representing the bottom hole reservoir pressure from the shift register 186 through the gate 188$_p$, and a temperature holding register 190$_t$ for receiving the binary number from the shift register 186 through the gate 188$_t$.

In use, the ultrasonic digital bottom hole unit 160 is prepared for substantially permanent installation within the oil well. This preparation consists generally of presetting the timer 168 to allow the desired operational duration for each interrogation, calibrating the temperature transducer 42 and the pressure transducer 44, and applying power to the receiver amplifier 164 whereby said amplifier may be in a stand-by mode for receiving an interrogation signal (turn-on command). The unit 160 is then sealed and attached to the bottom of the tubing 14 as hereinabove set forth. When reservoir temperature and pressure readings are desired, the well head interrogation switch 194 is thrown, thereby activating the oscillator 196 which in turn keys the ultrasonic transmitter 198 attached to the top of the tubing 14. The ultrasonic interrogation signal output of the transmitter 198 travels downwardly along the tubing 14 and is received by the bottom hole receiver 162. The interrogation signal is then amplified by the amplifier 164 and is used to start the turn-off timer 168 and to activate the bottom hole unit through the power control relay 166. A reference voltage $V_R$ is supplied to the temperature and pressure transducers 42 and 44 which in turn set up respective transducer voltages $V_t$ and $V_p$ proportional to the reservoir temperature and pressure, respectively. The voltages $V_t$ and $V_p$ are supplied to the input of the multiplexer 170. Assuming the multiplexer 170 to be initially in a temperature measuring state, the voltage $V_t$ will be passed through the multiplexer 170 as an analog input $V_a$ to the A-D converter 172. The A-D converter will then convert the voltage $V_a$ into a 10 bit binary number which will be serially shifted out of the converter by the continuous pulsing input of the clock pulser 176. The binary number representing temperature is converted to a dual frequency code as set forth above, the "1" bits keying oscillator 174(4) and the "0" bits (inverted) keying oscillator 174(3). The clock pulser 176 also provides continuous synchronizing pulses to the oscillator bank 174 thereby keying the oscillator 174(5). The outputs of the oscillator in the oscillator bank 174 will then be mixed and transmitted on an ultrasonic carrier frequency along the tubing 14 to the well head unit as hereinabove set forth.

As set forth above, the well head apparatus receives the ultrasonic information train at the top of the tubing 14 and separates the oscillator frequencies in the discriminator 184. The binary number representing temperature is serially shifted into the shift register 186, synchronization being provided by the clock pulses which are received and filtered through the filter 184(5). When the entire binary number has been shifted out of the converter 172 and transmitted to the well head, an end-of-conversion pulse is supplied to the multiplexer 170 thereby causing said multiplexer to generate a temperature load command pulse, to change states, and to then pass the pressure voltage $V_p$ as an analog input $V_a$ to the A-D converter 172. The temperature load command pulse is then supplied to the pressure gate 188$_p$ thereby gating the binary number (representing reservoir temperature) vertically out of the shift register 186 and into the temperature holding register 190$_t$ for display and for recording.

The pressure voltage $V_p$ is converted to a binary number in a like manner to that of the temperature described above and is then transmitted along the tubing 14 to the well head where it is received and entered into the shift register 186. An end-of-conversion pulse is again supplied to the multiplexer 170 and said multiplexer generates a pressure load command pulse which is transmitted along the tubing to the well head and which serves to gate the binary number (representing reservoir pressure) out of the shift register 186 through the gate 188$_p$ to the pressure holding register 190$_p$. This process is repeated until the timer 168 disconnects power to the sensor electronics thereby returning the bottom hole unit 160 to a stand-by mode.

A thermocouple refrigerator 219 (FIG. 14) is provided in the electronics compartment 22 for high temperature wells for cooling said electronics compartment. The unit 219 is continuously powered by the regulated power supply 52. This unit may also be used in the sonic unit 10, and the magnetic flux unit 138.

SEGMENTED BOTTOM HOLE INSTRUMENTATION UNIT

Figure 19:
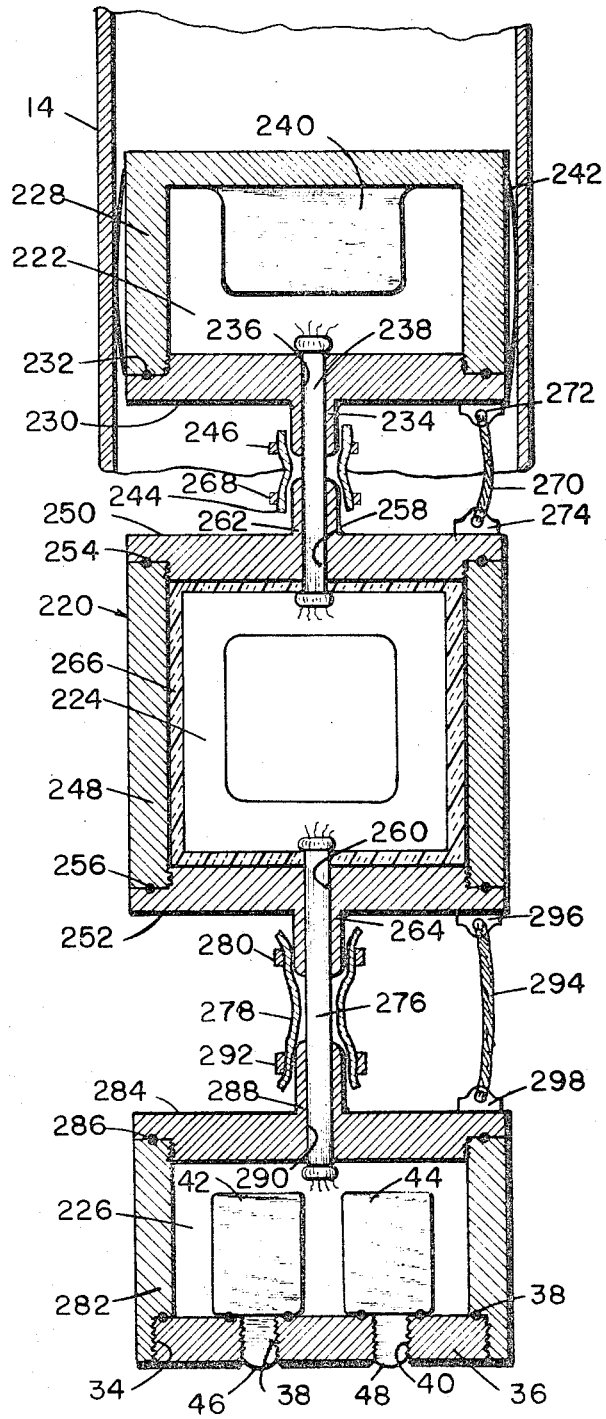
FIG. 19 is a sectional elevational view of a bottom hole instrumentation unit specifically designed and constructed to be permanently installed at the bottom of existing tubing without removing said tubing. This unit is adaptable for use with the bottom hole instrumentation units of FIG. 5 (sonic), FIG. 12 (magnetic flux) and FIG. 18 (ultrasonic).

Particular attention is directed to FIG. 19 which represents a bottom hole instrumentation unit generally indicated by reference character 220 which is particularly designed and constructed for substantially permanent installation in the oil well at the bottom of the existing tubing 14 without removing said tubing for the installation process. The unit 220 construction is such that it may be adapted for use by the sonic means, magnetic flux means, and the ultrasonic means described above. The tubing chain 14 may have some inherent curvature which would cause blockage of an elongated cylindrical housing such as employed in the sonic, magnetic flux, and ultrasonic means as described above. The tubing chain 14 may have some inherent curvature which would cause blockage of an elongated cylindrical housing such as employed in the sonic, magnetic flux, and ultrasonic means as described above, whereas the bottom hole unit 220 comprises a plurality of separate compartments which are connected by a flexible supporting means for the purpose of allowing passage of said unit 220 down through inside the existing tube chain 14.

The bottom hole unit 220 is compartmentized into separate compartments comprising a transmitting compartment 222, a power supply compartment 224, and a sensor compartment 226. The transmitting compartment 222 comprises a cylindrical housing 228, open at the bottom end, which has a cross sectional diameter slightly less than the inner diameter of the tubing 14, and a bottom plate member 230 which is threadedly secured to the housing 228, as shown in FIG. 19 A fluid tight seal for the compartment 222 is provided by a suitable O-ring 232 which is in pressure contact with the housing 228 and the plate 230. The plate 230 is provided with a centrally disposed outwardly extending sleeve 234. A centrally disposed vertical bore 236 is provided through the plate 230 in alignment with the sleeve 234 for receiving the connecting wiring cable 238 therethrough. A transmitter means generally indicated by reference character 240 is secured within the compartment 222 by any well known means (not shown), said transmitter means consisting of either the sonic tapping solenoid means 56, the magnetic flux coil oscillator 150a, or the ultrasonic transmitter and receiver 180 and 162, respectively. In the magnetic flux application, the housing 222 would of necessity be of a shape similar to the upper portion of the housing 140 of the magnetic flux bottom hole unit 138 for receiving the transmitting coil 150b therein. The outer periphery of the housing 222 is provided with a plurality of outwardly forcing leaf-type compression spring means 242 which are rigidly secured thereto for maintaining a desired vertical position of the unit 220 within the tubing 14 by the outward lateral force created against the inside walls of the tubing 14. The wiring cable 238 extends downwardly out of the compartment 222 and is protected from the reservoir fluid 50 by a flexible insulation sleeve 244 which surrounds the cable 238, the upper end of which is disposed over the sleeve 234 and secured thereto by an annular compression band 246. The compression band 246 is disposed around the outer periphery of the insulation sleeve 244 and the plate sleeve 234. The electronics compartment 224 comprises a cylindrical housing 248, open at the top and bottom, a top plate 250 and a bottom plate 252 threadedly secured to said housing 248 as shown in FIG. 19. Fluid tight seals for the compartment 224 are provided by suitable O-rings 254 and 256 which are in pressure contact with the housing 248 and the plates 250 and 252, respectively. The plates 250 and 252 are of identical constructions to that of the plate 230 described above, having centrally disposed bores 258 and 260, respectively, and centrally disposed outwardly extending sleeves 262 and 264, respectively. The interior of the compartment 224 is lined with insulation material 266 for protection against a rapid increase in temperature when the unit 220 is lowered into the well reservoir 50. The lower end of the cable 238 is journalled through the sleeve 262, the bore 258, and the insulation material 266 to the interior of the compartment 224. The lower end of the insulation sleeve 244 surrounding said cable 238 is journalled over the sleeve 262 and secured thereto by an annular compression band 268.

One or more supporting strips 270 are provided between the compartments 222 and 224 for supporting the weight of the lower compartments, thereby preventing the cable 238 from having to bear the excessive tension loads. The strips 270 are secured to the plates 230 and 250 by any well known means, such as the strip attach members 272 and 274, respectively. The upper end of a connection wiring cable 276 is journalled through the sleeve 264, the bore 260 of the lower plate 252 and the insulation material 266 to the interior of the compartment 224. The cable 276 like the cable 238 above, is protected from the reservoir environment by an insulation sleeve 278, the upper end of which is journalled on the sleeve 264 and secured thereto by an annular compression band 280.

The sensor compartment 226 comprises a cylindrical housing 282, open at the top and bottom ends, an upper end plate 284 which is constructed identically to the plates 230, 250 and 252 above and is threadedly secured to the housing 282 as shown in FIG. 19. A fluid tight seal is provided by a suitable O-ring 286 which is in pressure contact with the plate 284 and the housing 282. The plate 284 is also provided with an outwardly extending sleeve 288 in alignment with a centrally disposed bore 290 through said plate 284. The housing 282 is provided with a bottom plate 36 which is identical to the bottom plates of the sonic unit 10, the magnetic flux unit 138, and the ultrasonic unit 160 fully described above. The compartment 226 contains a temperature transducer 42 and pressure transducer 44 whose sensing elements 46 and 48 are exposed to the oil well reservoir 50 through the bores 38 and 40. The compartment 226 may also house a portion of the regulated power source 52 (not shown in FIG. 19). The lower end of the cable 276 is journalled within the sleeve 288 and the bore 290 of the plate 284 to the interior of the compartment 226. The lower end of the insulation sleeve 278 is journalled on the sleeve 288 and secured thereto by a compression band 292. The compartment 226 is supported by one or more supporting strips 294 connecting the upper plate 284 of the compartment 226 to the lower plate 252 of the compartment 224. The ends of the strips 294 are secured to the plates 252 and 284 by suitable attach members 296 and 298, respectively.

In use, the electronics of the bottom hole unit 220 will be prepared for installation in the appropriate manner described above. The segmented bottom hole unit 220 is then lowered to the bottom of the oil well through the existing tubing chain 14. The lower compartments 224 and 226 will freely slide within the tubing, being supported by the strips 270 and 294. The upper compartment 222 must be forced down the tubing 14 due to the outwardly lateral force exerted against the interior of the tubing 14 by the spring means 242. When the unit 220 has been lowered to a desired depth, with at least the upper compartments still being disposed within the tubing, the unit 220 is released and the spring means 242 will cause said unit to remain in its desired vertical position for future operation. It is to be noted that any well known instrument setting tool (not shown) may be used instead of the spring means 242 for setting the unit 220 at the desired vertical position within the tubing.

From the foregoing it will be apparent that the present invention provides a bottom hole indicator for the determination of reservoir pressure and temperature at the bottom of an oil well bore, particularly designed and constructed for substantially permanent bottom hole installation of the sensing instrumentation and utilization of the existing oil well tubing as a conductor for the pressure and temperature information. The novel bottom hole indicator is simple and efficient in operation and economical and durable in construction.

Whereas the present invention has been described in particular relation to the drawings attached hereto, it should be understood that other and further modifications, apart from those shown or suggested herein, may be made within the spirit and scope of this invention.

What is claimed is:

1. In combination with an oil well bore having well tubing extending therein, a bottom hole indicator for measuring the fluid reservoir pressure at the bottom of said oil well bore, comprising self-contained bottom instrumentation means substantially permanently installed in the well bore in the proximity of the bottom of the well tubing, said bottom hole instrumentation means comprising pressure sensing means, acoustical transmitting means operably connected to the pressure sensing means for producing and transmitting acoustical pulse data to the surface of the well, the said acoustical pulse data having a frequency directly proportional to the fluid reservoir pressure, data receiving means and processing means disposed at the surface of the well for receiving the pressure data from the bottom hole instrumentation means and for processing said data, and means operably connected to the processing means for recording and displaying said data, said transmitting means transmitting said data from the bottom hole instrumentation means to the data receiving means and processing means along the well tubing with said tubing acting as a conductor.

2. A bottom hole indicator for measuring the fluid reservoir pressure at the bottom of an oil well bore as set forth in claim 1 wherein the bottom hole instrumentation means comprises an elongated cylindrical housing open at each end, one end of said housing being threadedly secured to the bottom end of the well tubing in open communication with the fluid reservoir in said tubing, a cover plate removably secured to the opposite end of said housing, sealing means interposed between the housing and cover plate, said housing being compartmentized into an upper pressure compartment and a lower sensing and transmitting compartment, said compartments being separated by a partition plate rigidly secured to the inner walls of the cylindrical housing, the upper pressure compartment comprising cylindrical piston means slidably disposed therein, the upper surface of the piston being in contact with the fluid reservoir in the well tubing and an incompressible system fluid whose viscosity is substantially not affected by temperature change disposed between the piston and the partition plate whereby the system fluid pressure is the same as the reservoir pressure, a needle valve means centrally disposed within said partition plate for providing communication between the upper and lower compartments, said valve means comprising a centrally disposed vertical bore in the partition plate, the top of the bore being countersunk to provide a valve seat, a valve gate member comprising a cylindrical operator shaft of cross-sectional diameter substantially smaller than that of the vertical bore extending through said bore, and a gate member having a lower surface configuration complementary to the valve seat rigidly secured to the upper end of the operator shaft; the lower sensing and transmitting compartment comprising an inner housing rigidly secured to the lower surface of the partition plate to define a subcompartment, said inner housing having a fluid exhaust port in the lower portion thereof, said subcompartment being in communication with the upper pressure compartment through the needle valve means, an off-center-axis rotatable operator cam disposed within the subcompartment spaced below the needle valve bore, the lower end of the needle valve operator shaft being journalled through the vertical bore and engagable with the operator cam surface, a fluid tight clock drive means disposed within the subcompartment and comprising internal power supply and output drive shaft, the output drive shaft being operably connected with the operator cam for rotating said cam in alternately opening and closing the needle valve thereby permitting system fluid to flow from the upper pressure compartment into the subcompartment at a rate which is a function of the system fluid pressure, a meter type hydraulic motor secured to the subcompartment housing and having a rotatable output meter shaft, said motor including housing having an inlet port in communication with the subcompartment fluid exhaust port for receiving system fluid therethrough and an outlet port in communication with the lower compartment, said meter shaft extending into the lower compartment and having a rotational rate proportional to the flow rate of system fluid from the upper compartment through the needle valve and into the subcompartment, a striker cam rotatably disposed within the lower compartment and operably connected with the meter shaft for rotation thereby, said striker cam having a plurality of circumferentially spaced outwardly extending shoulders, and a cam follower striker arm having one end rigidly attached to the lower cover plate and the opposite end thereof being disposed under spring load pressure against the striker cam surface whereby rotation of the striker cam causes cooperation between the shoulders and the striker arm for emitting a tapping sound, said tapping sound being conducted through the bottom hole instrumentation housing means into the well tubing and along the length of said tubing to the surface of the well, said tapping sound having a frequency which is a function of the fluid reservoir pressure.

3. In combination with an oil well bore having well tubing extending therein, a bottom hole indicator for measuring the fluid reservoir pressure and temperature at the bottom of said oil well bore, comprising self-contained bottom hole instrumentation means substantially permanently installed in the well bore in the proximity of the bottom of the well tubing, said bottom hole instrumentation means comprising pressure and temperature sensing means, and transmitting means operably connected to the sensing means for transmitting pressure and temperature data to the surface of the well; data receiving and processing means disposed at the surface of the well for receiving the pressure and temperature data from the bottom hole instrumentation and for processing said data, and means operably connected to the processing means for recording and displaying said data, said transmitting means transmitting said pressure and temperature data from the bottom hole instrumentation means to the data receiving and processing means along the well tubing with the said tubing acting as a conductor and wherein the reservoir pressure and temperature sensing means comprises a resistance bridge type pressure transducer having a pressure sensitive element exposed to the fluid resevoir, the resistance value of said element varying as a function of resevoir fluid pressure, means for providing a reference voltage through the said resistance bridge whereby the output voltage of the pressure transducer measured across the bridge is proportional to the resevoir fluid pressure and a resistance bridge type temperature transducer having a temperature sensitive element exposed to the fluid resevoir, the resistance value of said element varying as a function of resevoir fluid temperature, means providing reference voltage through said resistance bridge whereby the output voltage of temperature transducer measured across the bridge is proportional to the resevoir fluid temperature.

4. A bottom hole indicator for measuring the fluid reservoir pressure and temperature at the bottom of an oil well bore as set forth in claim 3 wherein the self-contained bottom hole instrumentation means comprises a substantially cylindrical housing means having one end thereof removably secured to the bottom end of the well tubing; said housing means being compartmentized into an upper transmitting compartment, an electronics compartment disposed beneath the transmitting compartment, a power supply compartment disposed beneath the electronics compartment, and a lower sensor compartment; insulation material disposed on the interior walls of the electronics compartment for prevention of a rapid temperature increase upon installation of the housing means into the fluid reservoir; connection wiring for operably connecting said compartments; the temperature and pressure sensing means disposed within the sensor compartment; said sensor compartment being provided with ports through the housing means for journalling the pressure and temperature sensitive elements therethrough for exposure of said elements to the fluid reservoir; the power supply compartment comprising a self-contained regulated power source for providing electrical power upon command to the other compartments of the housing means; the electronics compartment comprising a clock timer means for periodic activation of the bottom hole instrumentation means, said clock timer means furnishing a command signal for providing electrical power to the compartments of the housing means and subsequently turning said instrumentation means off, a temperature voltage controlled oscillator operably connected to the temperature transducer, a pressure voltage controlled oscillator operably connected to the pressure transducer, a trigger generator, and a multiplexer means; the output of said temperature controlled oscillator operably connected to the multiplexer, said output being that of a square wave pulse train whose frequency is proportional to the voltage input from the temperature transducer, the output of the pressure voltage controlled oscillator operably connected to the multiplexer, said pressure voltage controlled oscillator output being that of a square wave pulse train whose frequency is proportional to the voltage input from the pressure transducer; the multiplexer means comprising a flip-flop circuit having one output connected to a temperature gating means and the other output connected to a pressure gating means; the trigger generator comprising a relaxation oscillator circuit and a driver means, the output of the trigger generator being a square wave pulse which is supplied to the multiplexer means each succeeding pulse changing the state of the flip-flop circuit thereby alternately gating the square wave pulse trains from the pressure and temperature voltage controlled oscillators through the multiplexer means to the transmitting means, said transmitting means disposed within the upper transmitting compartment, and rigidly attached to the upper interior surface of the transmitting compartment, said transmitting means comprising a sound transmission solenoid and a driver amplifier; said solenoid comprising a coil means and a striker plunger inserted within the coil means whereby the striker plunger will strike the upper interior surface of the transmitting compartment upon the passing of each pulse of the square wave pulse train from the pressure and temperature voltage controlled oscillators through the coil means, said clock timer means periodically activating the bottom hole instrumentation means whereby the pressure and temperature transducers will provide representative voltages to the pressure and temperature voltage controlled oscillators, the output pulse trains of said oscillators being alternately gated through the multiplexer means by the trigger generator to the sound transmission solenoid, each of said pulses causing the solenoid plunger to strike the upper interior surface of the transmitting compartment thereby emitting a tapping sound, said tapping sound being conducted through the bottom hole instrumentation housing means into the well tubing and along the length of said tubing to the surface of the well.

5. A bottom hole indicator for measuring the fluid reservoir pressure and temperature at the bottom of an oil well bore as set forth in claim 4 wherein the clock timer means comprises a clock motor, a timing mechanism with rotatable contact arms which upon rotation into closure will provide electrical power from the regulated power source to the sensor compartment components, the electronics compartment and to the transmitting compartment whereby said clock timer means may be preset to periodically provide electrical power for interrogation of the bottom hole instrumentation means for temperature and pressure measurements and for transmission of the data to the well surface and to subsequently turn said bottom hole instrumentation means off.

6. A bottom hole indicator for measuring the fluid reservoir pressure and temperature at the bottom of an oil well bore as set forth in claim 5 wherein the self-contained regulated power source comprises a nuclear power supply and wherein the data receiving means at the surface of the well comprises a contact microphone removably secured to the upper extremity of the well tubing for receiving temperature and pressure sonic data from the bottom hole instrumentation means, said data being conducted along the well tubing to the surface, a preamplifier for amplifying the received data, a feed back inverter amplifier for further amplifying and inverting the received data at the output of said feed back amplifier being operably connected to the processing means, and wherein the processing means disposed at the surface of the well is operably connected to the output of the receiving means and comprises a pulse conditioner, a pulse monostable circuit and a pulse meter means; the pulse conditioner comprising a pulse shaping inverter for inverting and squaring up each pulse of the received pulse train the output of the pulse conditioner connected to the pulse monostable circuit which further conditions the pulse train by again inverting and making uniform the duty cycle of the pulse in said pulse train, the output of the monostable circuit being a constant width pulse train operably connected to the pulse meter means, said pulse meter means comprising an inverter drive amplifier for inverting and amplifying the pulse train and a pulse meter which converts the pulse train into a direct scale meter deflection, the magnitude of the said meter deflection being a function of the frequency of the pulse train whereby the bottom hole fluid reservoir pressure and temperature may be alternately displayed and recorded.

7. A bottom hole indicator for measuring the fluid reservoir pressure and temperature at the bottom of an oil well bore as set forth in claim 6 wherein the cylindrical housing means comprises an elongated cylindrical housing open at one end, the opposite end thereof being removably secured to the bottom end of the well tubing, a cover plate removably secured to the open end of said housing, sealing means interposed between the cover plate and the cylindrical housing, said housing being longitudinally compartmentized, each compartment being separated from the adjacent compartment by a partition plate rigidly secured to the inner walls of the cylindrical housing, each partition plate being provided with a vertically disposed passageway for the journalling of connection wiring therethrough.

8. A bottom hole indicator for measuring the fluid reservoir pressure and temperature at the bottom of an oil well bore as set forth in claim 7 wherein, in addition a thermocouple refrigerator is disposed within the electronics compartment, said refrigerator being continuously powered by a regulated power source for the protection of the electronics compartment in high temperature wells.

9. A bottom hole indicator for measuring the fluid reservoir pressure and temperature at the bottom of an oil well bore as set forth in claim 5 wherein the self-contained regulated power source comprises at least one dry cell battery constructed to withstand high oil well reservoir temperatures, and wherein the data receiving means at the surface of the well comprises a contact microphone removably secured to the upper extremity of the well tubing for receiving temperature and pressure sonic data from the bottom hole instrumentation means, said data being conducted along the well tubing to the surface, a preamplifier for amplifying the received data, a feed back inverter amplifier for further amplifying and inverting the received data, the output of said feed back amplifier being operably connected to the processing means, wherein the processing means disposed at the surface of the well is operably connected to the output of the receiving means and comprises a pulse conditioner, a pulse monostable circuit and a pulse meter means, the pulse conditioner comprising a pulse shaping inverter for inverting and squaring up each pulse of the received pulse train, the output of the pulse conditioner connected to the pulse monostable circuit which further conditions the pulse train by again inverting and making uniform the duty cycle of the pulses in said pulse train, the output of the monostable circuit being a constant width pulse train operably connected to the pulse meter means, said pulse meter means comprising an inverter driver amplifier for inverting and amplifying the pulse train and a pulse meter which converts the pulse train into a direct scale meter deflection, the magnitude of the said meter deflection being a function of the frequency of the pulse train whereby the bottom hole fluid reservoir pressure and temperature may be alternately displayed and recorded; and wherein the cylindrical housing means comprises a plurality of cylindrical segments, each segment providing housing for each separate compartment, the cross-sectional diameter of each cylindrical segment being smaller than the inside diameter of the well tubing for journalling the bottom hole instrumentation means within said tubing to the bottom of the oil well bore; the upper most cylindrical segment housing for the transmitting compartment comprising a cylindrical housing member opened at one end, the opposite end thereof disposed within the lower extremity of the well tubing, an outwardly thrusting locking means secured to the exterior of the upper housing member and operably engagable with the inside walls of the well tubing for remotely locking said upper cylindrical member into a desired vertical position within the well tubing, a cover plate removably secured to the open end of said cylindrical member, sealing means interposed between the cylindrical member and cover plate, said cover plate comprising a plate member, a centrally disposed outwardly extending sleeve rigidly secured thereto, said plate member being provided with a centrally disposed bore in alignment with the outwardly extending sleeve; the electronics compartment housing disposed beneath the transmitting compartment, said electronics compartment housing comprising a cylindrical member open at each end, an upper cover plate removably secured to one end of said cylindrical member, said upper cover plate being substantially identical to that of the aforementioned transmitting compartment cover plate and the electronics cylindrical member, a lower cover plate removably secured to the opposite end of said cylindrical member, said lower cover plate being substantially identical to the aforementioned upper cover plate and oppositely disposed thereto, sealing means interposed between the lower cover plate and the cylindrical member, insulation material disposed on the interior walls of the electronics compartment for prevention of a rapid temperature increase upon installation of the housing means into the fluid reservoir, a wiring cable operably connected at one end of the transmitting means, the opposite end of said cable being journalled through the bore and sleeve of the transmitting compartment cover plate, through the sleeve and bore of the electronics compartment upper cover plate to the interior of the electronics compartment, an insulation sleeve surrounding the wiring cable between the transmitting compartment and electronics compartment, the extremities of said sleeve being journalled over the outwardly extending sleeves of the transmitting compartment cover plate and the electronics compartment upper cover plate, support strap means secured between the transmitting compartment and the electronics compartment for supporting the weight of the lower compartments, a lower combined sensing and power source compartment comprising a cylindrical member opened at each end, an upper cover plate removably secured to the upper end of said cylindrical member, the upper cover plate being substantially identical to the aforementioned electronics compartment lower cover plate and oppositely disposed thereto, sealing means interposed between the upper cover plate and the cylindrical member, a lower cover plate removably secured to the opposite end of the cylindrical member, sealing means interposed between the lower cover plate and the cylindrical means, said sensor and power source compartment being provided with ports through the housing means for journalling the pressure and temperature sensitive elements therein for exposure of said elements to the fluid reservoir, a wiring cable operably connecting the electronics compartment with the sensing and power source compartment, said cable being journalled through the bore and outwardly extending sleeve of the electronics compartment lower cover plate through the sleeve and bore of the sensing and power source compartment upper cover plate, an insulation sleeve surrounding said wiring cable between the two compartments the extremities of said insulation sleeve being journalled over the outwardly extending sleeve of the electronics compartment lower cover plate and the sensing and power source compartment upper cover plate, support strap means secured between the electronics compartment and the sensing and power source compartment for supporting the weight of the sensing and power source compartment.

10. A bottom hole indicator for measuring the fluid reservoir pressure and temperature at the bottom of an oil well bore as set forth in claim 9 wherein, in addition a thermocouple refrigerator is disposed within the electronics compartment, said refrigerator being continuously powered by a regulated power source for the protection of the electronics compartment in high temperature wells.

11. A bottom hole indicator for measuring the fluid reservoir pressure and temperature at the bottom of an oil well bore as set forth in claim 4 wherein the self-contained regulated power source comprises at least one dry cell battery constructed to withstand high oil well reservoir temperatures.

12. A bottom hole indicator for measuring the fluid reservoir pressure and temperature at the bottom of an oil well bore as set forth in claim 4 wherein the self-contained regulated power source comprises a nuclear power supply.

13. A bottom hole indicator for measuring the fluid reservoir pressure and temperature at the bottom of an oil well bore as set forth in claim 4 wherein the self-contained regulated power source comprises at least one high temperature solid state battery.

14. A bottom hole indicator for measuring the fluid reservoir pressure and temperature at the bottom of an oil well bore as set forth in claim 4 wherein the data receiving means at the surface of the well comprises a contact microphone removably secured to the upper extremity of the well tubing for receiving temperature and pressure sonic data from the bottom hole instrumentation means, said data being conducted along the well tubing to the surface, a preamplifier for amplifying the received data, and a feed back inverter amplifier for further amplifying and inverting the received data the output of said feed back amplifier being operably connected to the processing means.

15. A bottom hole indicator for measuring the fluid reservoir pressure and temperature at the bottom of an oil well bore as set forth in claim 4 wherein the processing means disposed at the surface of the well is operably connected to the output of the receiving means and comprises a pulse conditioner, a pulse monostable circuit and a pulse meter and recorder means; the pulse conditioner comprising a pulse shaping inverter for inverting and squaring up each pulse of the received pulse train the output of the pulse conditioner connected to the pulse monostable circuit which further conditions the pulse train by again inverting and making uniform the duty cycle of the pulses in said pulse train, the output of the monostable circuit being a constant width pulse train operably connected to the pulse meter recorder means, said pulse meter recorder means comprising an inverter driver amplifier for inverting and amplifying the pulse train, a pulse meter which converts the pulse train into a direct scale meter deflection the magnitude of the said meter deflection being a function of the frequency of the pulse train recorder whereby the bottom hole fluid reservoir pressure and temperature may be alternately displayed and recorded.

16. A bottom hole indicator for measuring the fluid reservoir pressure and temperature at the bottom of an oil well bore as set forth in claim 3 wherein the self-contained bottom hole instrumentation means comprises a substantially cylindrical housing means, an upwardly extending cylindrical coil housing member longitudinally disposed on one end of said housing means said cylindrical coil housing member being slidably disposed within the bottom end of the well tubing, said coil housing member having a centrally disposed annular groove around the outer periphery thereof, the cylindrical housing means being compartmentized into an electronics compartment disposed beneath the coil housing member, a power supply compartment disposed beneath the electronics compartment, and a lower sensor compartment; insulation material disposed on the interior walls of the electronics compartment for prevention of a rapid temperature increase upon installation of the housing means into the fluid reservoir, connection wiring for operably connecting said compartments; the temperature and pressure sensing means disposed within the sensor compartment; said sensor compartment being provided with ports through the housing means for journalling the pressure and temperature sensitive elements therethrough for exposure of said elements to the fluid reservoir; the power supply compartment comprising a self-contained regulated power source for providing electrical power upon command to the other compartments of the housing means; the electronics compartment comprising a clock timer means for periodic activation of the bottom hole instrumentation means, said clock timer means furnishing a command signal for providing electrical power to the compartments of the housing means and subsequently turning said instrumentation means off, a temperature voltage controlled oscillator operably connected to the temperature transducer, a pressure voltage controlled oscillator operably connected to the pressure transducer, a trigger generator, and a multiplexer means; the output of said temperature controlled oscillator operably connected to the multiplexer; said output being that of a square wave pulse train whose frequency is proportional to the voltage input from the temperature transducer, the output of the pressure voltage controlled oscillator operably connected to the multiplexer, said pressure voltage controlled oscillator output being that of a square wave pulse train whose frequency is proportional to the voltage input from the pressure transducer; the multiplexer means comprising a flip-flop circuit having one output connected to a pressure gating means; the trigger generator comprising a relaxation oscillator circuit and a driver means, the output of the trigger generator being a square wave pulse which is supplied to the multiplexer means, each succeeding pulse changing the state of the flip-flop circuit thereby alternately gating the square wave pulse trains from the pressure and temperature voltage controlled oscillators through the multiplexer means to the transmitting means, said transmitting means comprising a coil drive oscillator disposed within the electronics compartment and operably connected to the output of the multiplexer, a transmission coil disposed within the annular groove around the outer periphery of the coil housing member and in engagement with the inner walls of the well tubing, sealing means interposed between the coil housing member and the inner walls of the well tubing both above and below the annular groove, said transmission coil being operably connected to the output of the coil drive oscillator whereby the pressure and temperature transducers will provide representative voltages to the pressure and temperature voltage controlled oscillators, the output pulse trains of said oscillators being alternately gated through the multiplexer means by the trigger generator to the coil drive oscillator, each of said pulses keying the coil drive oscillator on and off to provide a pulsing current through the transmission coil thereby gating upon alternating magnetic lines of flux which intersect the walls of the well tubing and are conducted along the length of said tubing to the surface of the well.

17. A bottom hole indicator for measuring the fluid reservoir pressure and temperature at the bottom of an oil well bore as set forth in claim 16 wherein the clock timer means comprises a clock motor, a timing mechanism with rotatable clock arms which upon rotation into closure will provide electrical power from the regulated power source to the sensor compartment components, the electronics compartment and to the transmitting compartment whereby said clock timer means may be preset to periodically provide electrical power for the interrogation of the bottom hole instrumentation means for temperature and pressure measurements and for transmission of the data to the well surface and to subsequently turn said bottom hole instrumentation means off.

18. A bottom hole indicator for measuring the fluid reservoir pressure and temperature at the bottom of an oil well bore as set forth in claim 17 wherein the self-contained regulated power source comprises a nuclear power supply and wherein the data receiving means at the surface of the well comprises an annular coil housing slidably disposed around the outer periphery of the well tubing, a receiving coil disposed within said annular coil housing for inductively receiving the magnetic flux temperature and pressure data from the bottom hole instrumentation means, a preamplifier for amplifying the received data, and a feed-back inverter amplifier for further amplifying and inverting the received data, the output of said feed-back amplifier being operably connected to the processing means and wherein the processing means disposed at the surface of the well is operably connected to the output of the receiving means and comprises a pulse conditioner, a pulse monostable circuit and a pulse meter means; the pulse conditioner comprising a pulse shaping inverter for inverting and squaring up each pulse of the received pulse train, the output of the pulse conditioner connected to the pulse monostable circuit which further conditions the pulse train by again inverting and making uniform the duty cycle of the pulses in said pulse train, the output of the monostable circuit being a constant width pulse train operably connected to the pulse meter means, said pulse meter means comprising an inverter drive amplifier for inverting and amplifying the pulse train and a pulse meter which converts the pulse train into a direct scale meter deflection, the magnitude of the said meter deflection being a function of the frequency of the pulse train whereby the bottom hole fluid reservoir pressure and temperature may be alternately displayed and recorded.

19. A bottom hole indicator for measuring the fluid reservoir pressure and temperature at the bottom of an oil well bore as set forth in claim 18 wherein the cylindrical housing means comprises an elongated cylindrical housing open at one end, a cover plate removably secured to the open end of said housing, sealing means interposed between the cover plate and the cylindrical housing, said housing being longitudinally compartmentized, each compartment being separated from the adjacent compartment by a partition plate rigidly secured to the inner walls of the cylindrical housing, each partition plate being provided with a vertically disposed passageway for the journalling of connection wiring therethrough.

20. A bottom hole indicator for measuring the fluid reservoir pressure and temperature at the bottom of an oil well bore as set forth in claim 19 wherein, in addition a thermocouple refrigerator is disposed within the electronics compartment, said refrigerator being continuously powered by a regulated power source for the protection of the electronics compartment in high temperature wells.

21. A bottom hole indicator for measuring the fluid reservoir pressure and temperature at the bottom of an oil well bore as set forth in claim 17 wherein the self-contained regulated power source comprises at least one dry cell battery constructed to withstand high oil well reservoir temperatures, and wherein the data receiving means at the surface of the well comprises an annular coil housing slidably disposed around the outer periphery of the well tubing, a receiving coil disposed within said annular coil housing for inductively receiving the magnetic flux temperature and pressure data from the bottom hole instrumentation means, a preamplifier for amplifying the received data, and a feed-back inverter amplifier for further amplifying and inverting the received data, the output of said feed-back amplifier being operably connected to the processing means, and wherein the processing means disposed at the surface of the well is operably connected to the output of the receiving means and comprises a pulse conditioner, a pulse monostable circuit and a pulse meter means; the pulse conditioner comprising a pulse shaping inverter for inverting and squaring up each pulse of the received pulse train, the output of the pulse conditioner connected to the pulse monostable circuit which further conditions the pulse train by again inverting and making uniform the duty cycle of the pulses in said pulse train, the output of the monostable circuit being a constant width pulse train operably connected to the pulse meter means, said pulse meter means comprising an inverter driver amplifier for inverting and amplifying the pulse train and a pulse meter which converts the pulse train into a direct scale meter deflection, the magnitude of the said meter deflection being a function of the frequency of the pulse train whereby the bottom hole fluid reservoir pressure and temperature may be alternately displayed and recorded, and wherein the cylindrical housing means comprises a plurality of cylindrical segments, each segment providing housing for each separate compartment, the cross-sectional diameter of each cylindrical segment being smaller than the inside diameter of the well tubing for journalling the bottom hole instrumentation means within said tubing to the bottom of the oil well bore; the upper cylindrical segment housing comprising the aforementioned cylindrical coil housing member, an outwardly thrusting locking means secured to the exterior of the coil housing member and operably engagable with the inside walls of the well tubing for remotely locking said coil housing member into a desired vertical position within the well tubing, a centrally disposed outwardly extending sleeve secured to the bottom end of the cylindrical coil housing member said housing member being provided with a centrally disposed bore in alignment with the outwardly extending sleeve and in open communication with the annular groove; the electronics compartment housing disposed beneath the coil housing member, said electronics compartment housing comprising a cylindrical member open at each end, an upper cover plate removably secured to one end of said cylindrical member, sealing means interposed between the cylindrical member and the upper cover plate, said cover plate comprising a plate member, a centrally disposed outwardly extending sleeve rigidly secured thereto, said plate member being provided with a centrally disposed bore in alignment with the outwardly extending sleeve, a lower cover plate removably secured to the opposite end of said cylindrical member said lower cover plate being substantially identical to the afore mentioned upper cover plate and oppositely disposed thereto, sealing means interposed between the lower cover plate and the cylindrical member, insulation material disposed on the interior walls of the electronics compartment for prevention of a rapid temperature increase upon installation of the housing means into the fluid reservoir, a wiring cable operably connected at one end to the transmission coil, the opposite end of said cable being journalled through the bore and sleeve of the coil housing member, through the sleeve and bore of the electronics compartment upper cover plate to the interior of the electronics compartment, an insulation sleeve surrounding the wiring cable between the coil housing member and the electronics compartment, the extremities of said sleeve being journalled over the outwardly extending sleeves of the coil housing member and the electronics compartment upper cover plate, support strap means secured between the coil housing member and the electronics compartment for supporting the weight of the lower compartments; a lower combined sensing and power source compartment disposed beneath the electronics compartment said sensing and power source compartment comprising a cylindrical member open at each end, an upper cover plate removably secured to the upper end of said cylindrical member, the upper cover plate being substantially identical to the aforementioned electronics compartment lower cover plate and oppositely disposed thereto, sealing means interposed between the upper cover plate and the cylindrical member, a lower cover plate removably secured to the opposite end of the cylindrical member, sealing means interposed between the lower cover plate and the cylindrical means, said sensor and power source compartment being provided with ports through the housing means for journalling the pressure and temperature sensitive elements therein for exposure of said elements to the fluid reservoir, a wiring cable operably connecting the electronics compartment with the sensing and power source compartment, said cable being journalled through the bore and outwardly extending sleeve of the electronics compartment lower cover plate through the sleeve and bore of the sensing and power source upper cover plate, an insulation sleeve surrounding said wiring cable between the two compartments, the extremities of said insulation sleeve being journalled over the outwardly extending sleeve of the electronics compartment lower cover plate and the sensing and power source compartment upper cover plate, support strap means secured between the electronics compartment and the sensing and power source compartment for supporting the weight of the said sensing and power source compartment.

22. A bottom hole indicator for measuring the fluid reservoir pressure and temperature at the bottom of an oil well bore as set forth in claim 21 wherein, in addition a thermocouple refrigerator is disposed within the electronics compartment, said refrigerator being continuously powered by a regulated power source for the protection of the electronics compartment in high temperature wells.

23. A bottom hole indicator for measuring the fluid reservoir pressure and temperature at the bottom of an oil well bore as set forth in claim 16 wherein the self-contained regulated power source comprises at least one dry cell battery constructed to withstand high oil well reservoir temperatures.

24. A bottom hole indicator for measuring the fluid reservoir pressure and temperature at the bottom of an oil well bore as set forth in claim 16 wherein the self-contained regulated power source comprises a nuclear power supply.

25. A bottom hole indicator for measuring the fluid reservoir pressure and temperature at the bottom of an oil well bore as set forth in claim 16 wherein the self-contained regulated power source comprises at least one high temperature solid state battery.

26. A bottom hole indicator for measuring the fluid reservoir pressure and temperature at the bottom of an oil well bore as set forth in claim 16 wherein the data receiving means at the surface of the well comprises an annular coil housing slidably disposed around the outer periphery of the well tubing, a receiving coil disposed within said annular coil housing for inductively receiving the magnetic flux temperature and pressure data from the bottom hole instrumentation means, a preamplifier for amplifying the received data, and a feed-back inverter amplifier for further amplifying and inverting the received data, the output of the said feed-back amplifier being operably connected to the processing means.

27. A bottom hole indicator for measuring the fluid reservoir pressure and temperature at the bottom of an oil well bore as set forth in claim 16 wherein the processing means disposed at the surface of the well is operably connected to the output of the receiving means and comprises a pulse conditioner, a pulse monostable circuit and a pulse meter means; the pulse conditioner comprising a pulse shaping inverter for inverting and squaring up each pulse of the received pulse train, the output of the pulse conditioner connected to the pulse monostable circuit which further conditions the pulse train by again inverting and making uniform the duty cycle of the pulses in said pulse train, the output of the monostable circuit being a constant width pulse train operably connected to the pulse meter means, said pulse meter means comprising an inverter driver amplifier for inverting and amplifying the pulse train and a pulse meter which converts the pulse train into a direct scale meter deflection, the magnitude of the said meter deflection being a function of the frequency of the pulse train whereby the bottom hole fluid reservoir pressure and temperature may be alternately displayed and recorded.

28. A bottom hole indicator for measuring the fluid reservoir pressure and temperature at the bottom of an oil well bore as set forth in claim 3 wherein the self-contained bottom hole instrumentation means comprises a substantially cylindrical housing means having one end thereof removably secured to the bottom end of the well tubing, said housing means being compartmentized into an upper transmitting compartment, an electronics compartment disposed beneath the transmitting compartment, a power supply compartment disposed beneath the electronics compartment, and a lower sensing compartment, insulation material disposed on the interior walls of the electronics compartment for prevention of a rapid temperature increase upon installation of the housing means into the fluid reservoir, connection wiring for operably connecting said compartments; the temperature and pressure sensing means disposed within the sensor compartment, said sensor compartment being provided with ports through the housing means for journalling the pressure and temperature sensitive elements therethrough for exposure of said elements to the fluid reservoir, the power supply compartment comprising a self-contained regulated power source for providing electrical power upon command to the other compartments of the housing means; the electronics compartment comprising a bottom hole instrumentation interrogation means for providing electrical power to the compartments of the housing means, a timer means for subsequently turning said instrumentation off, a multiplexer means operably connected to the outputs of the temperature and pressure transducers for alternately passing the representative temperature and pressure voltages therethrough upon command, an analog to digital (A-D) converter whose input is operably connected with the output of the multiplexer means for alternately converting the input representative temperature and pressure voltages to a multibit binary number which is representative of said input voltages, a clock pulser operably connected to the A-D converter for serially shifting the binary number out of said converter, an oscillator bank comprising five oscillators, each oscillator set at a different output frequency thereby establishing five data and command channels, the binary number output of the A-D converter being used to key two of the oscillators of the oscillator bank, the pulses representing "1" keying a first oscillator, the "0" levels being inverted in a parallel output circuit keying the second oscillator thereby converting said binary number into a dual frequency code, a mixer driver operably connected to the output of the oscillator bank for mixing the outputs of the five oscillators, the output of said mixer driver being amplitude modulated on an ultrasonic carrier frequency whereby upon compression of the analog to digital conversion of a pressure measurement, an end-of-conversion pulse is provided by the A-D converter to the multiplexer, changing the state of said multiplexer thereby allowing the representative temperature voltage to pass through the multiplexer, to the A-D converter, simultaneously said multiplexer providing a pressure load command to a third oscillator of the oscillator bank for subsequent transmission to the well surface, and upon compression of the temperature conversion said multiplexer likewise providing a temperature load command to a fourth oscillator of the oscillator bank, a clock pulser also providing continuous synchronizing pulses to a fifth oscillator of the oscillator bank, a transmitting means disposed within the transmitting compartment and rigidly attached to the upper interior surface of the transmitting compartment said transmitting means comprising an ultrasonic transmitter operably connected to the output of the mixer driver, the ultrasonic output of said transmitter being conducted through the bottom hole instrumentation housing means into the well tubing and along the length of said tubing to the surface of the well.

29. A bottom hole indicator for measuring the fluid reservoir pressure and temperature at the bottom of an oil well bore as set forth in claim 28 wherein the interrogation means comprises an ultrasonic receiver disposed within the transmitting compartment and rigidly secured to the upper surface thereof for receiving an ultrasonic interrogation command signal from the well surface, said command signal being transmitted downwardly along the well tubing to the bottom hole instrumentation means, a tuned amplifier disposed within the electronics compartment and operably connected with the ultrasonic receiver for amplifying said command signals, the output of the said tuned amplifier being used to start the turn-off timer means and also to activate the bottom hole instrumentation means through the power control relay.

30. A bottom hole indicator for measuring the fluid reservoir pressure and temperature at the bottom of an oil well bore as set forth in claim 29 wherein the self-contained regulated power source comprises a nuclear power supply and wherein the data receiving means at the surface of the well comprises an ultrasonic receiver removably secured to the upper extremity of the well tubing at the surface of the well for receiving the demodulated ultrasonic data from the bottom hole instrumentation means, said data being conducted along the well tubing to the surface of the well and wherein the processing means disposed at the surface of the well is operably connected to the output of the receiving means and comprises a discriminator bank, a shift register, gating means, and a holding register means; said discriminator bank comprising five filter means whose frequency passing characteristics correspond to the output frequencies of the five aforementioned oscillators of the bottom hole instrumentation oscillator bank and five buffers, one for each filter for conditioning the output pulses from each of said filters, the first and second filter passing in pulses representing "1" and "0" of the binary number of the received data for input to the shift register, the third filter passing the pressure load command for input to the gating means, the fourth filter passing the temperature load command for input to the gate means and the fifth filter for passing the continuous synchronizing pulses from the bottom hole instrumentation clock pulse, the output from the said fifth filter and buffer being operably connected to the output of the shift register and synchronizing the serial entry of the binary number therein; the gating means comprising a temperature gating means, and a pressure gating means, said gating means operably connected to the output of the shift register and to the input of the holding register means, said holding register means comprising a temperature holding register and a pressure holding register whereby the receipt of a pressure load command signal from the bottom hold instrumentation means will enable the pressure gating means thereby gating a pressure binary number in the shift register into the pressure holding register for display and recording purposes and also clearing said shift register for the receipt of a temperature binary number where again after entry of the temperature binary number the receipt of a temperature load command signal will gate said temperature binary number out of the shift register and into the temperature holding register for display and recording.

31. A bottom hole indicator for measuring the fluid reservoir pressure and temperature at the bottom of an oil well bore as set forth in claim 30 wherein the cylindrical housing means comprises an elongated cylindrical housing open at one end, the opposite end thereof being removably secured to the bottom end of the well tubing, a cover plate removably secured to the open end of said housing, sealing means interposed between the cover plate and the cylindrical housing, said housing being longitudinally compartmentized, each compartment being separated from the adjacent compartment by a partition plate rigidly secured to the inner walls of the cylindrical housing, each partition plate being provided with a vertically disposed passageway for the journalling of connection wiring therethrough.

32. A bottom hole indicator for measuring the fluid reservoir pressure and temperature at the bottom of an oil well bore as set forth in claim 31 wherein, in addition, a thermocouple refrigerator is disposed within the electronics compartment said refrigerator being continuously powered by a regulated power source for the protection of the electronics compartment in high temperature wells.

33. A bottom hole indicator for measuring the fluid reservoir pressure and temperature at the bottom of an oil well bore as set forth in claim 29 wherein the self-contained regulated power source comprises at least one dry cell battery constructed to withstand high oil well reservoir temperatures and wherein the data receiving means at the surface of the well comprises an ultrasonic receiver removably secured to the upper extremity of the well tubing at the surface of the well for receiving the demodulated ultrasonic data from the bottom hole instrumentation means, said data being conducted along the well tubing to the surface of the well, and wherein the processing means disposed at the surface of the well is operably connected to the output of the receiving means and comprises a discriminator bank, a shift register, gating means, and a holding register means; said discriminator bank comprising five filter means whose frequency passing characteristics correspond to the output frequencies of the five aforementioned oscillators of the bottom hole instrumentation oscillator bank and five buffers, one for each filter for conditioning the output pulses from each of said filters, the first and second filters passing in pulses representing "1" and "0" of the binary number of the received data for input to the shift register, the third filter passing the pressure load command for input to the gating means, the fourth filter passing the temperature load command for input to the gating means and the fifth filter for passing the continuous synchronizing pulses from the bottom hole instrumentation clock pulse, the output from said fifth filter and buffer being operably connected to the shift register and synchronizing the serial entry of the binary number therein; the gating means comprising a temperature gating means, and a pressure gating means, said gating means operably connected to the output of the shift register and to the input of the holding register means said holding register means comprising a temperature holding register and a pressure holding register whereby the receipt of a pressure load command signal from the bottom hole instrumentation means will enable the pressure gating means thereby gating a pressure binary number in the shift register into the pressure holding register for display and recording purposes and also clearing said shift register for the receipt of a temperature binary number where again after entry of the temperature binary number the receipt of a temperature load command signal will gate said temperature binary number out of the shift register and into the temperature holding register for display and recording and wherein the cylindrical housing means comprises a plurality of cylindrical segments, each segment providing housing for each separate compartment, the cross-sectional diameter of each cylindrical segment being smaller than the inside diameter of the well tubing for journalling the bottom hole instrumentation means within said tubing to the bottom of the oil well bore; the uppermost cylindrical segment housing for the transmitting compartment comprising a cylindrical housing member opened at one end, the opposite end thereof disposed within the lower extremity of the well tubing, an outwardly thrusting locking means secured to the exterior of the upper housing member and operably engagable with the inside walls of the well tubing for remotely locking said upper cylindrical member into a desired vertical position within the well tubing, a cover plate removably secured to the open end of said cylindrical member, sealing means interposed between the cylindrical member and cover plate, said cover plate comprising a plate member a centrally disposed outwardly extending sleeve rigidly secured thereto, said plate member being provided with a centrally disposed bore in alignment with the outwardly extending sleeve; the electronics compartment housing disposed beneath the transmitting compartment, said electronics compartment housing comprising a cylindrical member open at each end, an upper cover plate removably secured to one end of said cylindrical member, said upper cover plate being substantially identical to that of the aforementioned transmitting compartment cover plate and oppositely disposed thereto, sealing means between the upper cover plate and the electronics cylindrical member, a lower cover plate removably secured to the opposite end of said cylindrical member said lower cover plate being substantially identical to the aforementioned upper cover plate and oppositely disposed thereto, sealing means interposed between the lower cover plate and the cylindrical member, insulation material disposed on the interior walls of the electronics compartment for prevention of a rapid temperature increase upon installation of the housing means into the fluid reservoir, a wiring cable operably connected at one end to the transmitting means, the opposite end of said cable being journalled through the bore and sleeve of the transmitting compartment cover plate, through the sleeve and bore of the electronics compartment upper cover plate to the interior of the electronics compartment, an insulation sleeve surrounding the wiring cable between the transmitting compartment and electronics compartment, the extremities of said sleeve being journalled over the outwardly extending sleeve of the transmitting compartment cover plate and the electronics compartment for supporting the weight of the lower compartments, a lower combined sensing and power source compartment disposed beneath the electronics compartment said sensing and power source compartment comprising a cylindrical member opened at each end, an upper cover plate removably secured to the upper end of said cylindrical member, the upper cover plate being substantially identical to the aforementioned electronics compartment lower cover plate and oppositely disposed thereto, sealing means interposed between the upper cover plate and the cylindrical member, a lower cover plate removably secured to the opposite end of the cylindrical member, sealing means interposed between the lower cover plate and the cylindrical means, said sensor and power source compartment being provided with ports through the housing means for journalling the pressure and temperature sensitive elements therein for exposure of said elements to the fluid reservoir, a wiring cable operably connecting the electronics compartment with the sensing and power source compartment, said cable being journalled through the bore and outwardly extending sleeve of the electronics compartment lower cover plate through the sleeve and bore of the sensing and power source compartment upper cover plate, an insulation sleeve surrounding said wiring cable between the two compartments the extremities of said insulation sleeve being journalled over the outwardly extending sleeve of the electronics compartment lower cover plate and the sensing and power source compartment upper cover plate, support strap means secured between the electronics compartment and the sensing and power source compartment.

34. A bottom hole indicator for measuring the fluid reservoir pressure and temperature at the bottom of an oil well bore as set forth in claim 33 wherein, in addition, a thermocouple refrigerator is disposed within the electronics compartment, said refrigerator being continuously powered by a regulated power source for the protection of the electronics compartment in high temperature wells.

35. A bottom hole indicator for measuring the fluid reservoir pressure and temperature at the bottom of an oil well bore as set forth in claim 28 wherein the self-contained regulated power source comprises at least one dry cell battery constructed to withstand high oil well reservoir temperatures.

36. A bottom hole indicator for measuring the fluid reservoir pressure and temperature at the bottom of an oil well bore as set forth in claim 28 wherein the self-contained regulated power source comprises at least one high temperature solid state battery.

37. A bottom hole indicator for measuring the fluid reservoir pressure and temperature at the bottom of an oil well bore as set forth in claim 28 wherein the self-contained regulated power source comprises a nuclear power supply.

38. A bottom hole indicator for measuring the fluid reservoir pressure and temperature at the bottom of an oil well bore as set forth in claim 28 wherein the data receiving means at the surface of the well comprises an ultrasonic receiver removably secured to the upper extremity of the well tubing at the surface of the well for receiving the demodulated ultrasonic data from the bottom hole instrumentation means said data being conducted along the well tubing to the surface of the well.

39. A bottom hole indicator for measuring the fluid reservoir pressure and temperature at the bottom of an oil well bore as set forth in claim 28 wherein the processing means disposed at the surface of the well is operably connected to the output of the receiving means and comprises a discriminator bank, a shift register, gating means, and a holding register means; said discriminator bank comprising five filter means whose frequency passing characteristics correspond to the output frequencies of the five aforementioned oscillators of the bottom hole instrumentation oscillator bank and five buffers, one for each filter for conditioning the output pulses from each of said filter, the first and second filter passing in pulses representing the "1" and "0" of the binary number of the received data for input to the shift register, the third filter passing the pressure load command for input to the gating means, the fourth filter passing the pressure load command for input to the gating means and the fifth filter for passing continuous synchronizing pulses from the bottom hole instrumentation clock pulser, the output from said fifth filter and buffer being operably connected to the shift register and synchronizing the serial entry of the binary number therein; the gating means comprising a temperature gating means, and a pressure gating means, said gating means operably connected to the output of the shift register and to the input of the holding register means said holding register means comprising a temperature holding register and a pressure holding register whereby the receipt of a pressure load command signal from the bottom hole instrumentation means will enable the pressure gating means thereby gating a pressure binary number in the shift register into the pressure holding register for display and recording purposes and also clearing said shift register for the receipt of a temperature binary number where again after entry of the temperature binary number the receipt of a temperature load command signal will gate said temperature binary number out of the shift register and into the temperature holding register for display and recording.

* * * * *